US007725018B2

(12) United States Patent
Konishi

(10) Patent No.: US 7,725,018 B2
(45) Date of Patent: May 25, 2010

(54) FOCUS CONTROL APPARATUS, IMAGE SENSING APPARATUS AND FOCUS CONTROL METHOD

(75) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 11/781,545

(22) Filed: Jul. 23, 2007

(65) Prior Publication Data

US 2008/0031611 A1 Feb. 7, 2008

(30) Foreign Application Priority Data

Aug. 1, 2006 (JP) .............................. 2006-210253
May 9, 2007 (JP) .............................. 2007-124693

(51) Int. Cl.
G03B 3/00 (2006.01)
G03B 13/00 (2006.01)

(52) U.S. Cl. ....................... 396/102; 396/133; 348/352; 348/353

(58) Field of Classification Search ......... 348/352–356; 396/95, 102–104, 125, 133, 153
See application file for complete search history.

(56) References Cited

U.S. PATENT DOCUMENTS 5,692,118 A * 11/1997 Yasukawa ................... 396/153

6,928,241 B2 * 8/2005 Hirai ........................... 396/125
2003/0169363 A1 * 9/2003 Ogino ......................... 348/345

FOREIGN PATENT DOCUMENTS

| JP | 2001-208959 | 8/2001 |
|---|---|---|
| JP | 2003-018450 | 1/2003 |
| JP | 2004-102135 | 4/2004 |

OTHER PUBLICATIONS

"NHK Technical Research Report (1965, vol. 17, Issue 1, Serial No. 86, pp. 21-37)" (with partial translation).

* cited by examiner

Primary Examiner—W. B. Perkey
Assistant Examiner—Dennis Hancock
(74) Attorney, Agent, or Firm—Cowan, Liebowitz & Latman, P.C.

(57) ABSTRACT

A range in which a focus lens is to be moved is set; the focus lens is moved within the set range; an in-focus state is determined based on output signals from an image sensing unit which are obtained in association with the movement of the focus lens within the range; and the focus lens is driven so that an object image is brought into focus. When a difference between the positions of the focus lens, at which the plurality of images are brought into focus, is equal to or lower than a preset threshold, the range will be set to be wider than a range in the case where the difference exceeds the threshold.

21 Claims, 19 Drawing Sheets

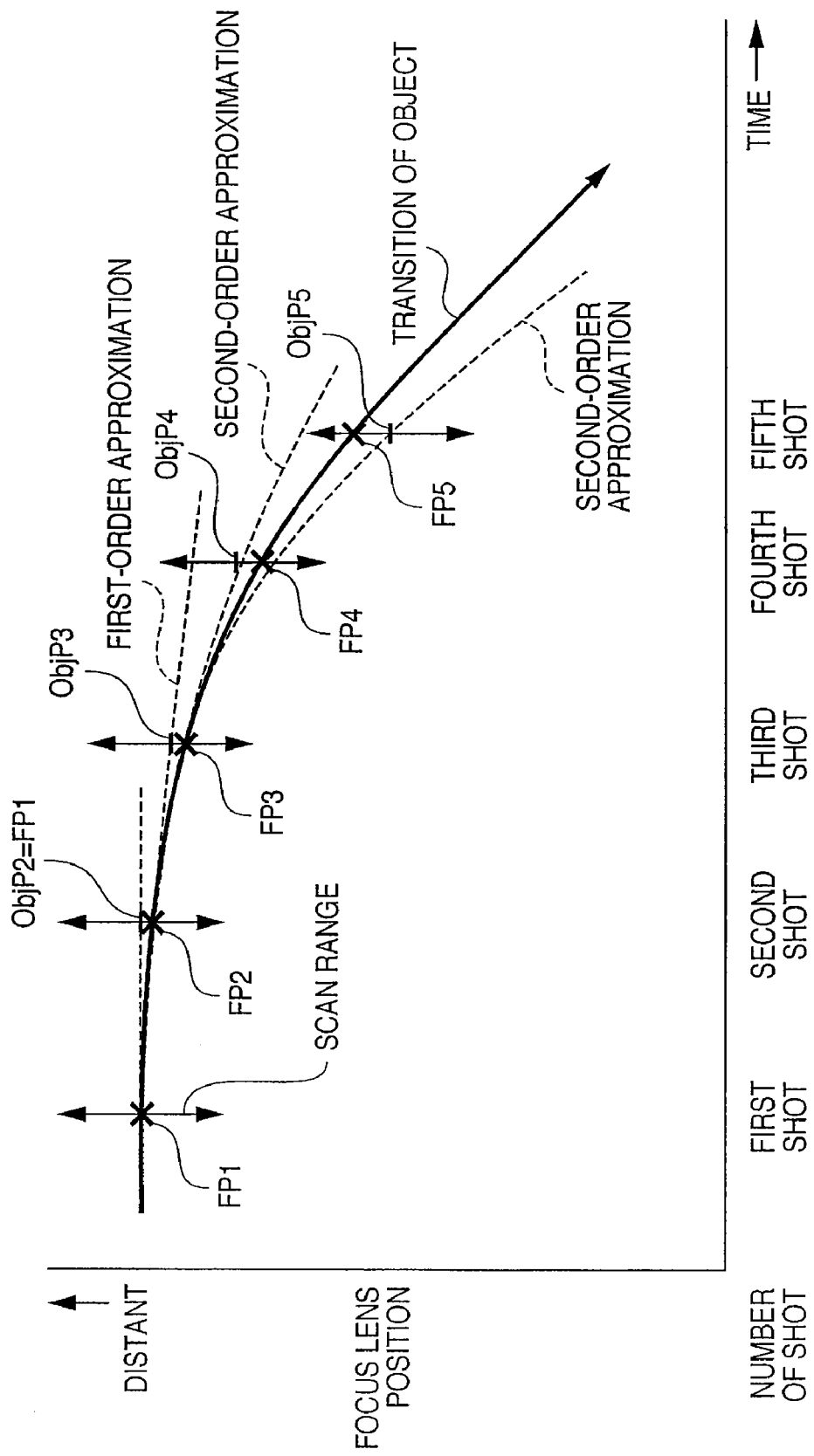

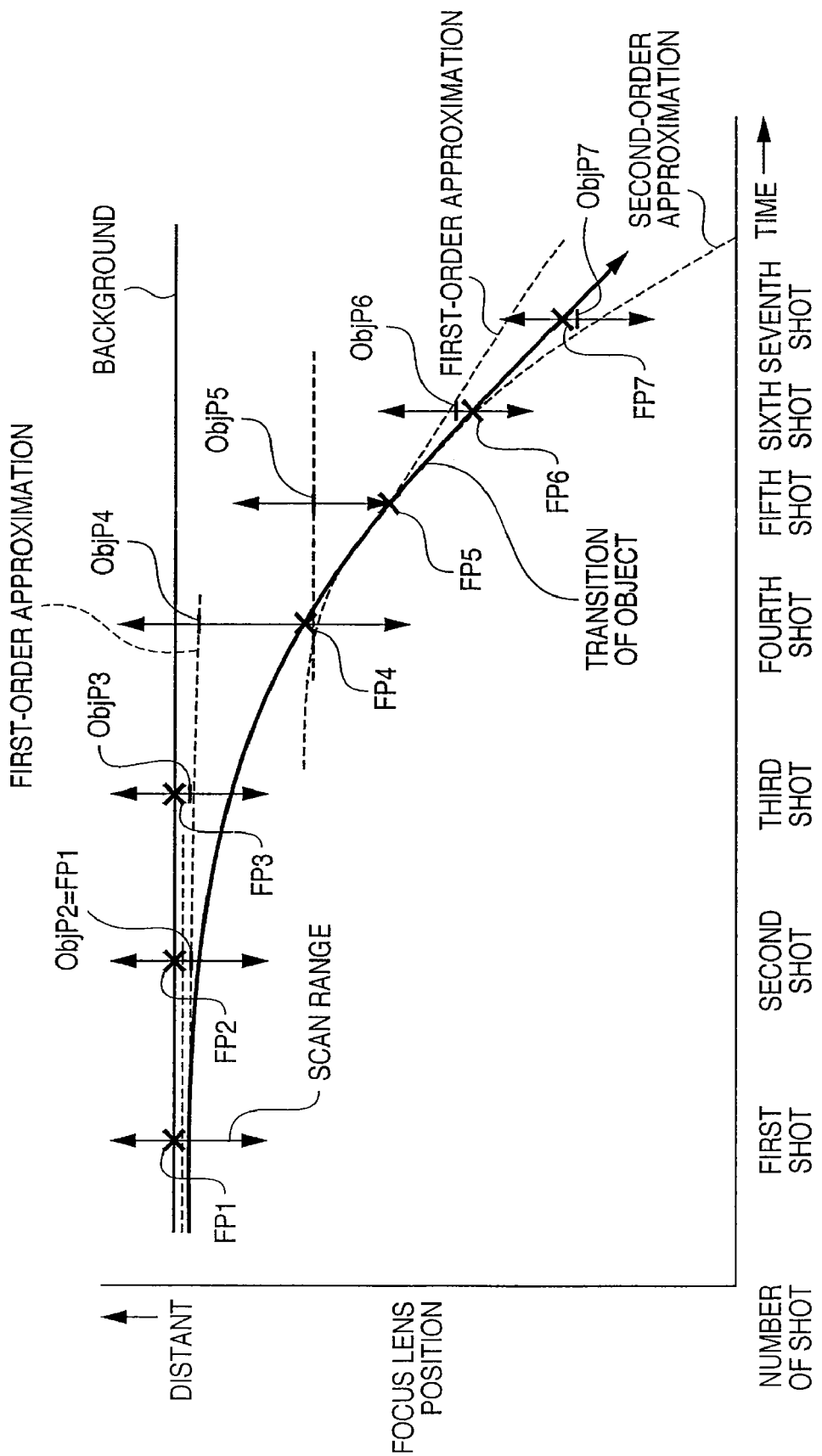

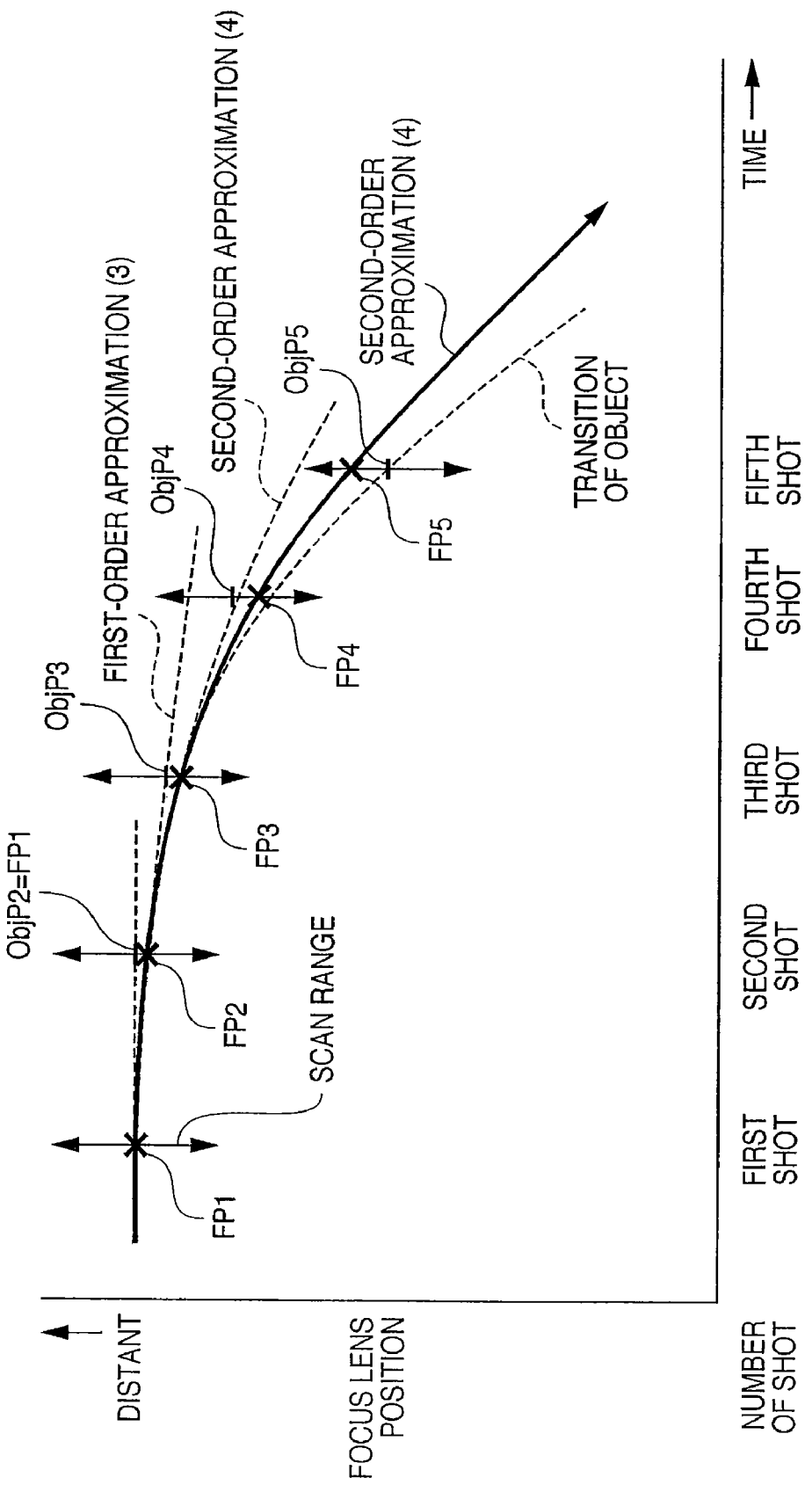

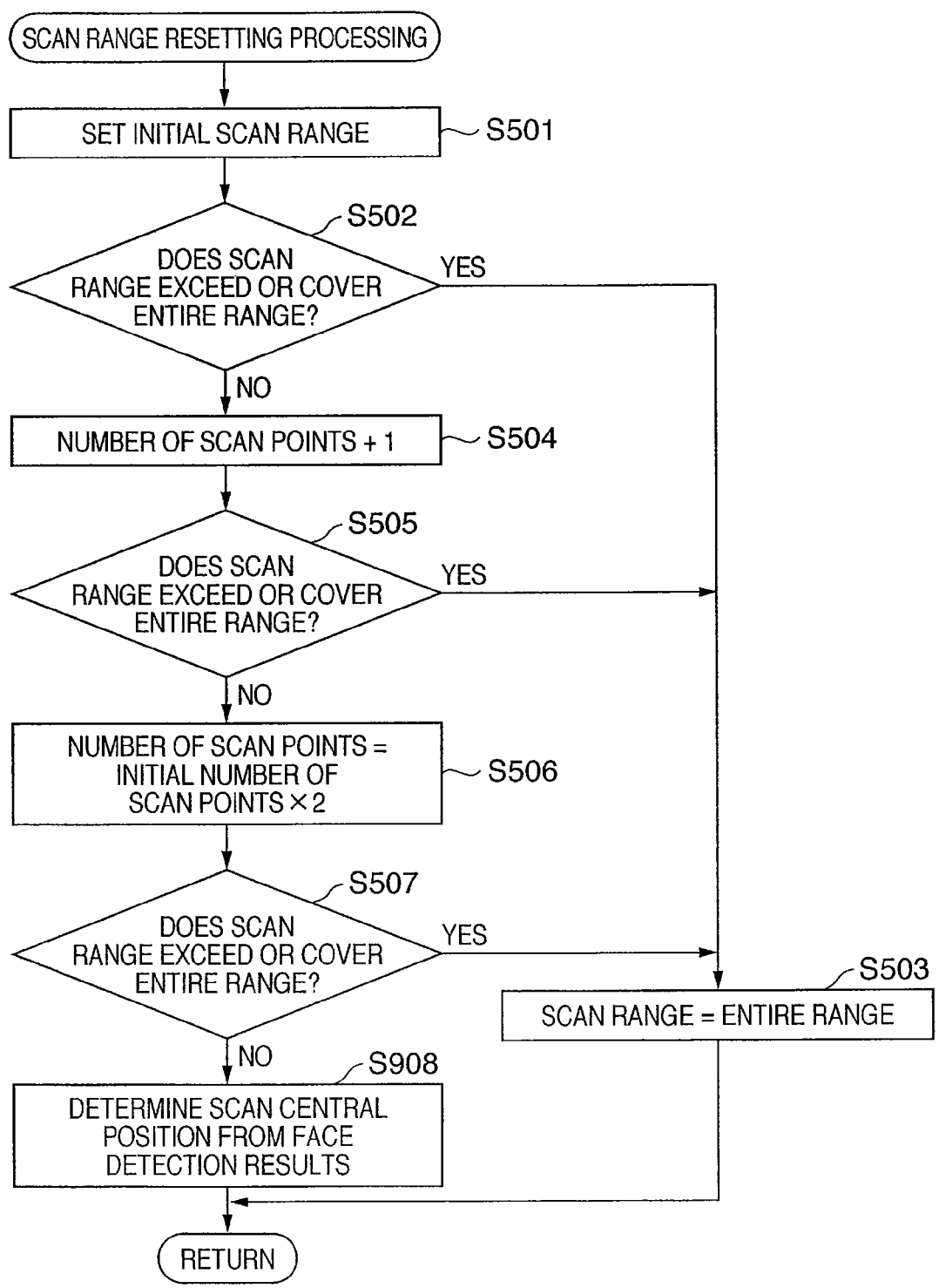

FOCUS CONTROL APPARATUS, IMAGE SENSING APPARATUS AND FOCUS CONTROL METHOD

BACKGROUND OF THE INVENTION

1. Field of the Invention

The present invention relates to focus control technology.

2. Description of the Related Art

One of focus control techniques used with electronic cameras is the so-called contrast detection scheme, in which focus control is performed by using a focus lens position that maximizes the high-frequency components of a luminance signal of an object image that is formed on an image sensing sensor as an in-focus position at which a desired object image enters an in-focus state. An abundance of high-frequency components in the luminance signal of an object image indicates that the object image has a high contrast, and therefore, is in better focus compared to a case where the amount of high-frequency components is low. For instance, refer to NHK Technical Research Report (1965, Volume 17, Issue 1, Serial Number 86, pp. 21-37). With such a contrast detection scheme, the focus lens is moved to acquire high-frequency components of object images at a plurality of different focus lens positions (scanning operation), and is then moved to a position that maximizes the high-frequency components.

However, due to the limited amount of time for performing scanning operations in so-called sequential image sensing with short image sensing intervals, focusing is locked at the in-focus position at the start of sequential image sensing, or the moving range of the focus lens for scanning operations in the interval between one image sensing and the next image sensing in the sequential image sensing is limited.

In addition to the sequential image sensing, performing AF control every time image sensing is performed has a problem in that a release time lag occurs between the time when image sensing commencement request operations are performed by an operator, and the time when image sensing is actually performed. In consideration thereof, when it is desirable to perform image sensing while prioritizing release time speed, since the amount of time for performing scanning operations is limited, a method is proposed in which focusing is locked at the in-focus position of the last image sensing (For instance, refer to Japanese Patent Application Laid-Open No. 2003-018450). Additionally, a method is proposed for limiting the moving range of a focus lens during scanning operations. (For instance, refer to Japanese Patent Application Laid-Open No. 2001-208959).

Furthermore, a method is proposed for bringing a moving object into focus in which, when performing focus control for the next image sensing, the time required for focus control is reduced by setting the moving range of a focus lens to be equally distributed on both sides of the present in-focus position. For instance, refer to Japanese Patent Application Laid-Open No. 2004-102135.

Moreover, since image sensing is sequentially performed at short time intervals during sequential image sensing, in many cases, the object is moving in the same direction among consecutive image sensings. Therefore, it is possible to partially predict the in-focus position at the time of the next image sensing, based on the direction of movement of the object up to the time of the previous image sensing; or based on the driving direction, i.e., the direction of movement of the in-focus position, up to the time of the previous image sensing. A method is proposed which utilizes the characteristic to vary distribution of the driving range of a focus lens using the present in-focus position as a reference. For instance, refer to Japanese Patent Laid-Open No. 2002-122773.

The example shown in FIGS. 16A to 16C shows in-focus positions at three consecutive image sensings. In FIG. 16C, based on the directions of movement of the in-focus position at the time of the second last image sensing, in FIG. 16A, and the last image sensing, in FIG. 16B, and, using the in-focus position at the last image sensing, in FIG. 16B, as reference, the far-side and near-side distributions (SC1, SC2) of the scan range with respect to the in-focus position at the last image sensing are arranged so as to differ from each other. In other words, the far- or near-side distribution extending toward the same direction as the direction of movement up to the last image sensing is set wider than the other.

By thus varying distributions of the driving range of a focus lens based on the direction of movement of the in-focus position up to the last image sensing, it is now possible to drive the focus lens in an effective manner and speed up focusing operations.

However, as shown by the preceding conventional example, performing focus control while uniformly prioritizing the reduction of release time lag has a risk in that the background or other objects that is not the main object may be brought into focus, or that erroneous focusing will be performed. In particular, since the conventional example of sequential image sensing described above merely set one of the far- and near-side scan range distributions wider than the other without changing the reference position (i.e., the in-focus position at the last image sensing) thereof, the example is incapable of dealing with an object that gradually increases its image plane movement speed. More specifically, since the image plane movement speed increases at an accelerating pace for an ordinary object that approaches at constant speed, it may be difficult for the conventional example to bring an object moving in such an ordinary manner into focus.

Furthermore, with the conventional method, in cases where, for instance, an object with a significantly high contrast that is not a main object exists in the background or the like, and the object is within the focus detection area, detection results will reflect an in-focus position that relies on the high-frequency components of a luminance signal other than that of the main object. Moreover, the following problem exists when an object such as the background that is not the desired object is erroneously brought into focus. Specifically, there are cases where the in-focus position of the main object will not enter the driving range of the focus lens even when the far- or near-side of distribution extending toward the same direction as the direction of movement up to the last image sensing is set wider than the other, and an object such as the background will remain in focus.

SUMMARY OF THE INVENTION

The present invention has been made in consideration of the above situation, and has as its object to provide a focus control technique that is capable of tracking and bringing a moving object into focus, and bringing a desired object back into focus when an object other than the main object is erroneously brought into focus.

Another object of the present invention is to provide a focus control technique that is capable of determining whether or not an object that is not the desired object has been erroneously brought into focus.

According to the present invention, the foregoing object is attained by providing a focus control apparatus comprising: a moving range determination unit that determines a range in which a focus lens is to be moved; and a controller that makes the focus lens move within a range determined by the moving range determination unit, determines an in-focus state based on an output signal from an image sensing unit obtained in association with the movement of the focus lens within the range, and controls a focus lens driver so that an object image is brought into focus, wherein, when a difference between positions of the focus lens, at which a plurality of images are brought into focus, is equal to or lower than a preset threshold, the moving range determination unit determines as the range a range that is wider than a range that is determined in a case where the difference exceeds the threshold.

According to the present invention, the foregoing object is also attained by providing an image sensing apparatus comprising above-described focus control apparatus and the image sensing unit.

Further, the foregoing object is also attained by providing a focus control method comprising: a moving range determination step of determining a range in which a focus lens is to be moved; and a control step of moving the focus lens in a range determined in the moving range determination step, determining an in-focus state based on an output signal from an image sensing unit obtained in association with the movement of the focus lens within the range, and moving the focus lens so that an object image is brought into focus, wherein, when a difference between positions of the focus lens, at which a plurality of images are brought into focus, is equal to or lower than a preset threshold, the moving range determination step determines as the range a range that is wider than a range that is determined in a case where the difference exceeds the threshold.

Furthermore, the foregoing object is also attained by providing a focus control apparatus comprising: an image sensing unit that photoelectrically converts an object image formed by a focus lens and acquires an image; and a controller that detects an in-focus state of the focus lens based on an image acquired from the image sensing unit in association with the movement of the focus lens, and controls the position of the focus lens based on the detected in-focus state, wherein the controller changes the range in which the focus lens is to be moved upon detection of the in-focus state based on a change in object size in images acquired by the image sensing unit.

Further, the foregoing object is also attained by providing a focus control method comprising: a control step of detecting an in-focus state of the focus lens based on an image acquired from the image sensing unit in association with the movement of the focus lens, and controlling the position of the focus lens based on the detected in-focus state, wherein the range in which the focus lens is to be moved upon detection of the in-focus state is changed based on a change in object size in images acquired by the image sensing unit.

Further, the foregoing object is also attained by providing a focus control apparatus comprising: an image sensing unit that photoelectrically converts an object image formed by a focus lens and acquires an image; a detection unit that detects characteristic information of an object from an image obtained by the image sensing unit; a range determination unit that determines a range in which the focus lens is to be moved; and a controller that detects an in-focus state of the focus lens based on an image acquired from the image sensing unit in association with the movement of the focus lens within a range determined by the range determination unit, and controls the position of the focus lens based on the detected in-focus state so that the object image is brought into focus, wherein the range determination unit detects an in-focus predicted position from the positions of the focus lens at which the object is brought into focus in the plurality of images obtained by image sensing, and changes the range in which the focus lens is to be moved based on the in-focus predicted position and the detection results of the detection unit.

Further, the foregoing object is also attained by providing a focus control method comprising: a detecting step of detecting characteristic information of an object from an image obtained by photoelectrically converting an object image formed by a focus lens; a range determination step of determining a range in which the focus lens is to be moved; and a control step of detecting an in-focus state of the focus lens based on an image acquired in association with the movement of the focus lens within a range determined in the range determination step, and controlling the position of the focus lens based on the detected in-focus state so that the object image is brought into focus, wherein, in the range determination step, an in-focus predicted position is detected from the position of the focus lens at which the object is brought into focus in the plurality of images obtained by image sensing, and the range in which the focus lens is to be moved is changed based on the in-focus predicted position and the detection results in the detection step.

Further, the foregoing object is also attained by providing an image sensing apparatus comprising either of the focus control apparatuses described above and the focus lens.

Further features of the present invention will become apparent from the following description of exemplary embodiments, with reference to the attached drawings.

BRIEF DESCRIPTION OF THE DRAWINGS

FIGS. 6A and 6B describe in-focus positions with respect to the movement of an object, and AF processing between continuous shooting, according to the first embodiment of the present invention;

FIGS. 12A and 12B describe in-focus positions with respect to the movement of an object, and AF processing between continuous shooting, according to the third embodiment of the present invention;

FIG. 14 is a flowchart showing a procedure of scan range resetting processing according to the fourth embodiment of the present invention;

DESCRIPTION OF THE EMBODIMENTS

Apparatus Configuration

Figure 1:
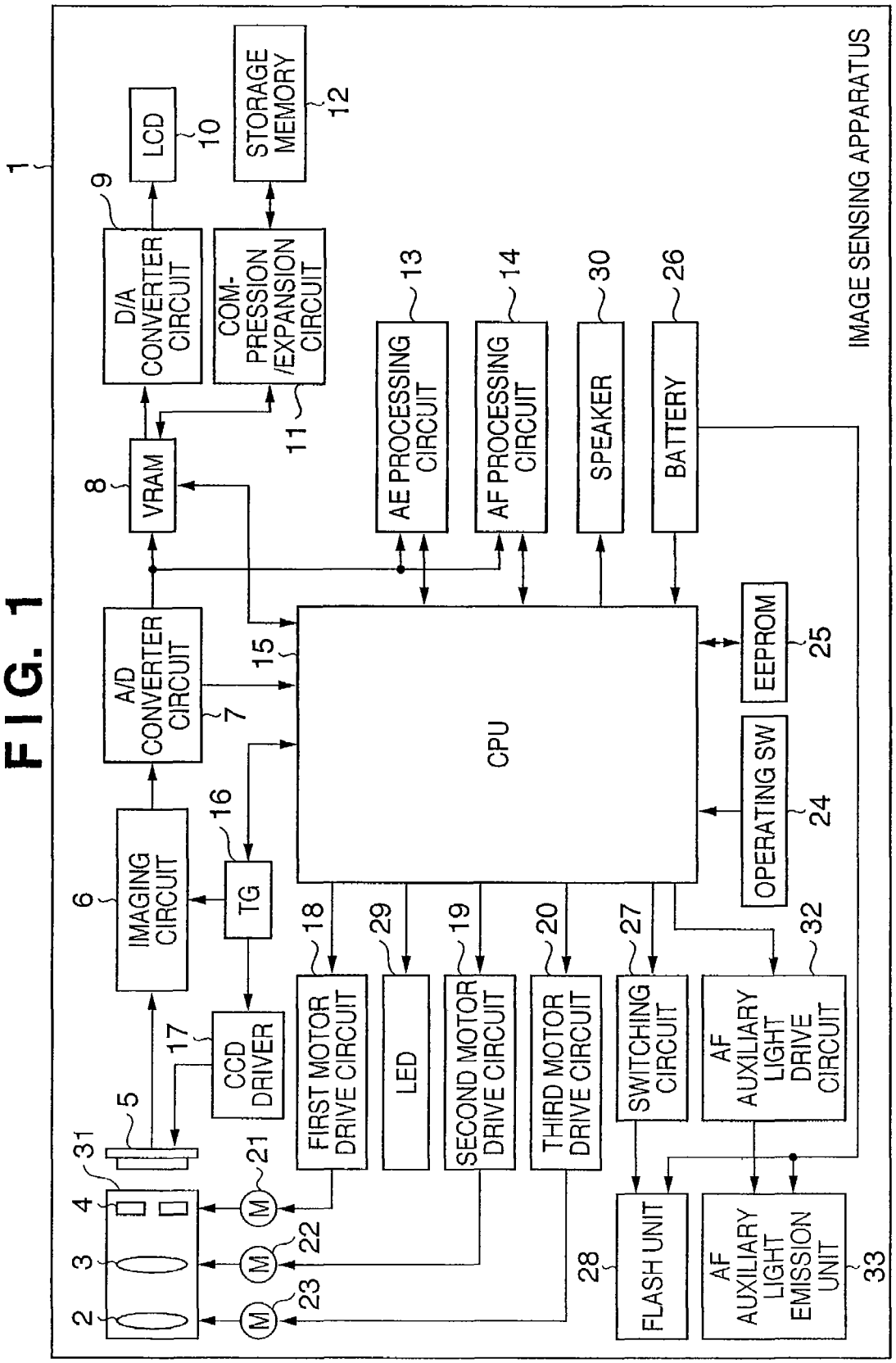
FIG. 1 is a block diagram showing a configuration of an image sensing apparatus according to first to fifth second embodiments of the present invention.

FIG. 1 is a block diagram showing a configuration of an image sensing apparatus according to a first embodiment of the present invention. In FIG. 1, reference numeral 1 denotes an image sensing apparatus, reference numeral 2 denotes a zoom lens group, reference numeral 3 denotes a focus lens group, and reference numeral 4 denotes a diaphragm that controls quantity of light by controlling the quantity of light flux that passes through an image sensing optical system comprising the zoom lens group 2 and the focus lens group 3, and also controls exposure to a solid state imagesensor 5, to be described hereinafter. Reference numeral 31 denotes an image sensing lens barrel comprising the zoom lens group 2, the focus lens group 3, the diaphragm 4 and the like. Reference numeral 5 denotes a solid state image sensor typified by CCD or CMOS sensors (hereinafter "CCD") with a light-receiving surface on which an optical object image, which passes the image sensing lens barrel 31 and is subject to light quantity control by the diaphragm 4, is formed. The formed object image is photoelectrically converted to output an electric image signal.

Reference numeral 6 denotes an image sensing circuit that receives the image signal outputted by the CCD 5 and generates an image signal of a predetermined format by performing various image processing, while reference numeral 7 denotes an A/D converter circuit that converts the analog image signal generated by the image sensing circuit 6 to a digital image signal (image data). Reference numeral 8 denotes a memory (VRAM), such as a buffer memory, that temporarily stores the image data outputted by the A/D converter circuit 7. Reference numeral 9 denotes a D/A converter circuit that reads out and converts the image signal that is stored in the VRAM 8 into an analog image signal, and converts the image signal to a format appropriate for image display, while reference numeral 10 denotes an image display apparatus, such as a liquid crystal display (hereinafter "LCD"), that displays the analog image signal. An electronic viewfinder function may be achieved by successively displaying images acquired from the CCD 5 on the LCD 10 via the VRAM 8 and the D/A converter circuit 9 without storing the images in a storage memory 12, to be described hereinafter.

Reference numeral 12 denotes a storage memory, comprising a semiconductor memory or the like, for storing image data. A semiconductor memory such as a flash memory, or a semiconductor memory such as a card-type flash memory that has a card shape or a stick shape and which is formed so as to be detachable with respect to the image sensing apparatus 1, may be used as the storage memory 12. Alternatively, various configurations are applicable, including magnetic storage media such as a hard disk or a Floppy disk®.

Reference numeral 11 denotes a compression/expansion circuit, comprising an expansion circuit and a compression circuit. The compression circuit reads out image data temporarily stored in the VRAM 8, and performs compression processing, coding processing, and the like, to convert the image data into a format appropriate for storage in the storage memory 12. The expansion circuit performs decoding processing, expansion processing, and the like, to convert image data stored in the storage memory 12 to a format appropriate for image display and the like. For instance, when a mode switch (not shown) among operational switches 24 (to be described hereinafter) is operated to change the mode to an image sensing mode, and a release switch is further operated to instruct an exposure and recording operation, the following processing is performed. First, as described above, the image data temporarily stored in the VRAM 8 is compressed and coded by the compression circuit of the compression/expansion circuit 11, and stored in the storage memory 12. Then, when the mode changes to playback mode, a playback operation commences and the following processing is performed. First, image data stored in the storage memory 12 is expanded and decoded by the expansion circuit of the compression/expansion circuit 11, and temporarily stored in the VRAM 8. Image data temporarily stored in the VRAM 8 is converted via the D/A converter circuit 9 by the processing described earlier into an analog signal of a format appropriate for displaying, and then displayed on the LCD 10 as an image.

Reference numeral 15 denotes a CPU with a built-in processor memory and which controls the entire image sensing apparatus 1, while reference numeral 13 denotes an automatic exposure (AE) processing circuit that performs AE processing based on the digital image signal outputted by the A/D converter circuit 7. The AE processing circuit 13 performs arithmetic processing, such as cumulative addition, on the luminance value of one screen's worth of digital image signals that are digitized by the A/D converter circuit 7, and calculates an AE evaluation value according to the brightness of the object. The AE evaluation value is outputted to the CPU 15.

Reference numeral 14 denotes an automatic focus control (AF) processing circuit that performs AF processing based on the digital image signal outputted by the A/D converter circuit 7. Among the one screen's worth of digital image signals digitalized by the A/D converter circuit 7, the AF processing circuit 14 extracts, via a high pass filter (HPF) or the like, high-frequency components of image data corresponding to a portion of a screen specified as an AF area. In addition, the AF processing circuit 14 performs arithmetic processing, such as cumulative addition, to calculate a focus evaluation value corresponding to the contour component quantity and the like of the high-frequency side. As per the AF process, the AF processing circuit 14 assumes the role of high frequency component detection unit that detects a predetermined high frequency component of an image signal generated by the CCD 5. An AF area may occupy a single central location. Otherwise, an AF area may occupy a plurality of locations, including a central portion and adjacent portions, or a plurality of discretely distributed locations.

Reference numeral 16 denotes a timing generator (TG) that generates a predetermined timing signal, while reference numeral 17 denotes a CCD driver that drives the CCD 5. The TG 16 outputs a predetermined timing signal to the CPU 15, the image sensing circuit 6, and the CCD driver 17, whereby the CPU 15 performs various controls in synchronization with the timing signal. The image sensing circuit 6 receives the timing signal from the TG 16, and performs various image processing, such as chrominance signal separation, in synchronization with the timing signal. Furthermore, the CCD driver 17 receives the timing signal from the TG 16, and drives the CCD 5 in synchronization with the timing signal.

Reference numeral 21 denotes a diaphragm drive motor that drives the diaphragm 4, reference numeral 18 denotes a first motor drive circuit that drives/controls the diaphragm drive motor 21, reference numeral 22 denotes a focus drive motor that drives the focus lens group 3, and reference numeral 19 denotes a second motor drive circuit that drives/controls the focus drive motor 22. Reference numeral 23 denotes a zoom drive motor that drives the zoom lens group 2, reference numeral 20 denotes a third motor drive circuit that drives/controls the zoom drive motor 23, and reference numeral 24 denotes operational switches comprising various switch groups.

The CPU 15 respectively controls the first motor drive circuit 18, the second motor drive circuit 19, and the third motor drive circuit 20. As a result, the CPU 15 respectively drives/controls the diaphragm 4, the focus lens group 3, and the zoom lens group 2, via the diaphragm drive motor 21, the focus drive motor 22, and the zoom drive motor 23. More specifically, the CPU 15 controls the first motor drive circuit 18, based on the focus evaluation value and the like calculated by the AE processing circuit 13, to drive the diaphragm drive motor 21, and performs AE control to adjust the aperture of the diaphragm 4 to an appropriate level.

In addition, the CPU 15 controls the second motor drive circuit 19, based on the focus evaluation value signal calculated by the scanning AF processing circuit 14, to drive the focus drive motor 22, and performs AF control to move the focus lens group 3 to an in-focus position. When a zoom switch (not shown) among the operational switches 24 is operated, the CPU 15, in response thereto, controls the third motor drive circuit 20 and drives/controls the zoom drive motor 23 to move the zoom lens group 2, thereby performing magnifying operations (zoom operations) of the image sensing optical system.

In addition, the operation switches 24 include the following: a main power switch that activates the image sensing apparatus 1 and supplies power, a release switch that initiates image sensing operations (storage operations) and the like, a playback switch that initiates playback operations, a zoom switch that issues an instruction to change the zoom magnification or, in other words, to move the zoom lens group 2, and the like. According to the present embodiment, the release switch is configured by a two-stage switch that includes a first stroke (hereinafter "SW1") and a second stroke (hereinafter "SW2"). SW1 generates, prior to an image sensing operation, an instruction signal for commencing AE processing and AF processing. SW2 generates an instruction signal for commencing exposure recording operations for actual image sensing and recording.

Reference numeral 25 denotes an EEPROM that is an electrically-rewritable read-only memory that pre-stores programs for performing various control, data used to perform various operations, and the like. Reference numeral 26 denotes a battery, 28 a flash unit, 27 a switching circuit that controls flash emission by the flash unit 28, 29 a display element, such as an LED, for performing alarm display and the like, and 30 a speaker for providing audio guidance or issuing warnings.

Reference numeral 33 denotes an AF auxiliary light emission unit comprising a light source such as an LED, while reference numeral 32 denotes an AF auxiliary light drive circuit that drives the AF auxiliary light emission unit 33.

First Embodiment

Figure 2:
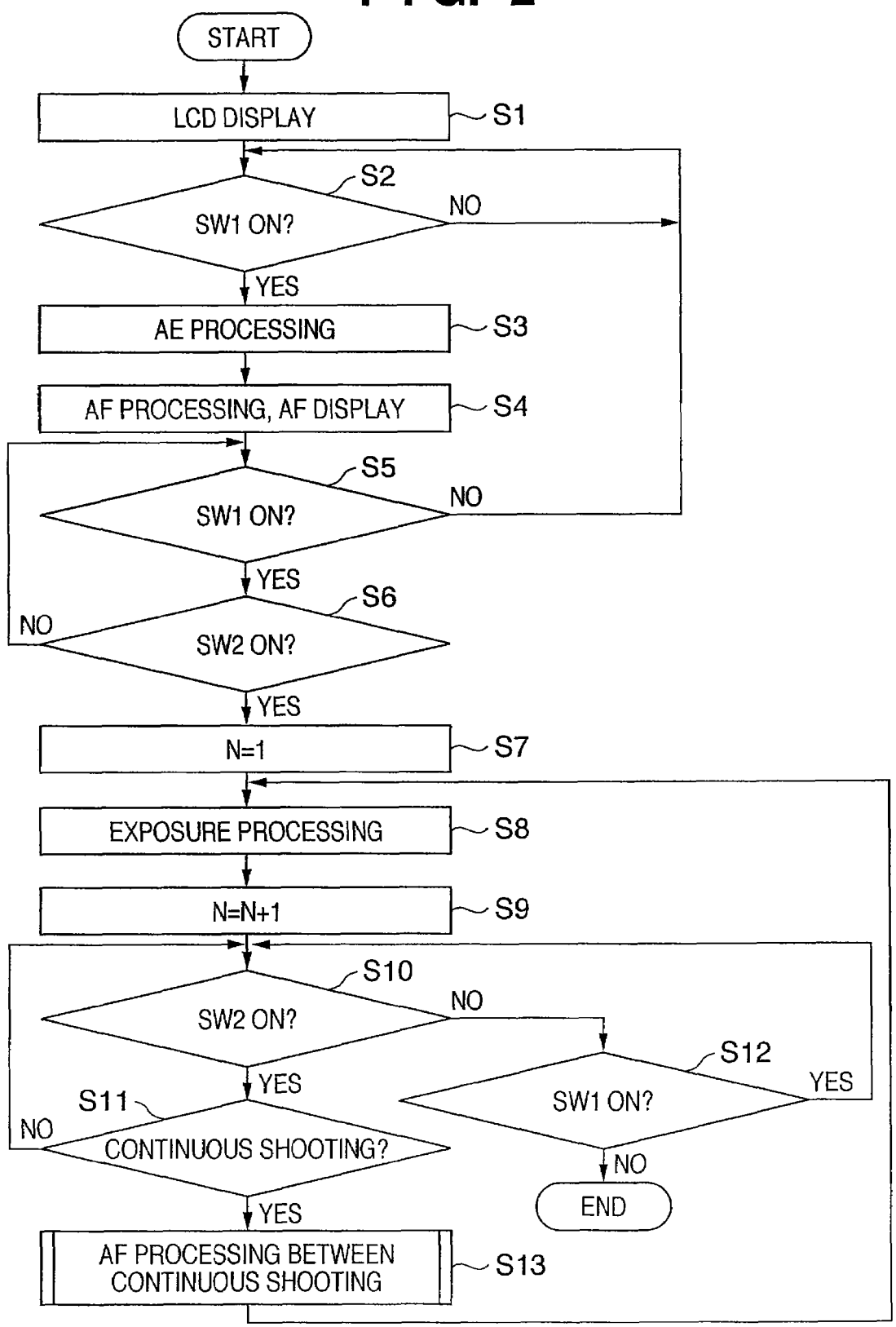
FIG. 2 is a flowchart showing a procedure of image sensing processing according to the first and the second embodiments of the present invention.

Following is a description of image sensing operations performed by the image sensing apparatus 1 according to the first embodiment, and configured as per the foregoing, with reference to the flowchart shown in FIG. 2.

According to the description of the present invention, an operation for acquiring a focus evaluation values based on an output of the CCD 5 while driving the focus lens group 3 to predetermined positions is referred to as scanning. In addition, positions of the focus lens at which focus evaluation values are acquired are referred to as scan points, intervals between scan points as scan intervals, the number of focus evaluation values to be acquired as a scan point number, and a driving range of the focus lens group 3 in which focus evaluation values are referred to as a scan range.

The image sensing processing sequence shown in FIG. 2 is executed when the main power switch of the image sensing apparatus 1 has been turned on and the operation mode of the image sensing apparatus 1 is in image sensing (recording) mode.

In step S1, as described above, the CPU 15 displays an object optical image passed through the image sensing lens barrel 31 and formed on the CCD 5 as an image on the LCD 10 via the image sensing circuit 6, the A/D converter circuit 7, the VRAM 8, and the D/A converter circuit 9. The LCD 10 functions as an electronic view finder by performing this processing at predetermined time intervals. The user will be able to verify a scene to be sensed by observing the image displayed on the LCD 10.

In step S2, the status of the release switch among the operating switches 24 is confirmed. When the CPU 15 confirms that the release switch has been operated by the photographer, and SW1 has been turned on, the sequence proceeds to step S3 to perform AE processing. Thereupon, the CPU 15 controls the first motor drive circuit 18, based on an AE evaluation value obtained by the AE processing circuit 13, to control the aperture of the diaphragm 4 via the diaphragm drive motor 21. More specifically, the CPU 15 controls the diaphragm 4 so that the diaphragm 4 opens when the AE evaluation value is low, i.e., when the obtained image is dark, and closes when the AE evaluation value is high, i.e., when the obtained image is bright, to obtain an image with appropriate brightness (AE evaluation value).

AF processing is performed in step S4. Through AF processing, a position of the focus lens group 3 is obtained where the high-frequency component of an image signal obtained by the CCD 5 is maximized, whereby the CPU 15 controls the focus drive motor 22 via the second motor drive circuit 19 to move the focus lens group 3 to the obtained position. Following is an outline of AF processing, with reference to FIG. 3.

Figure 3:
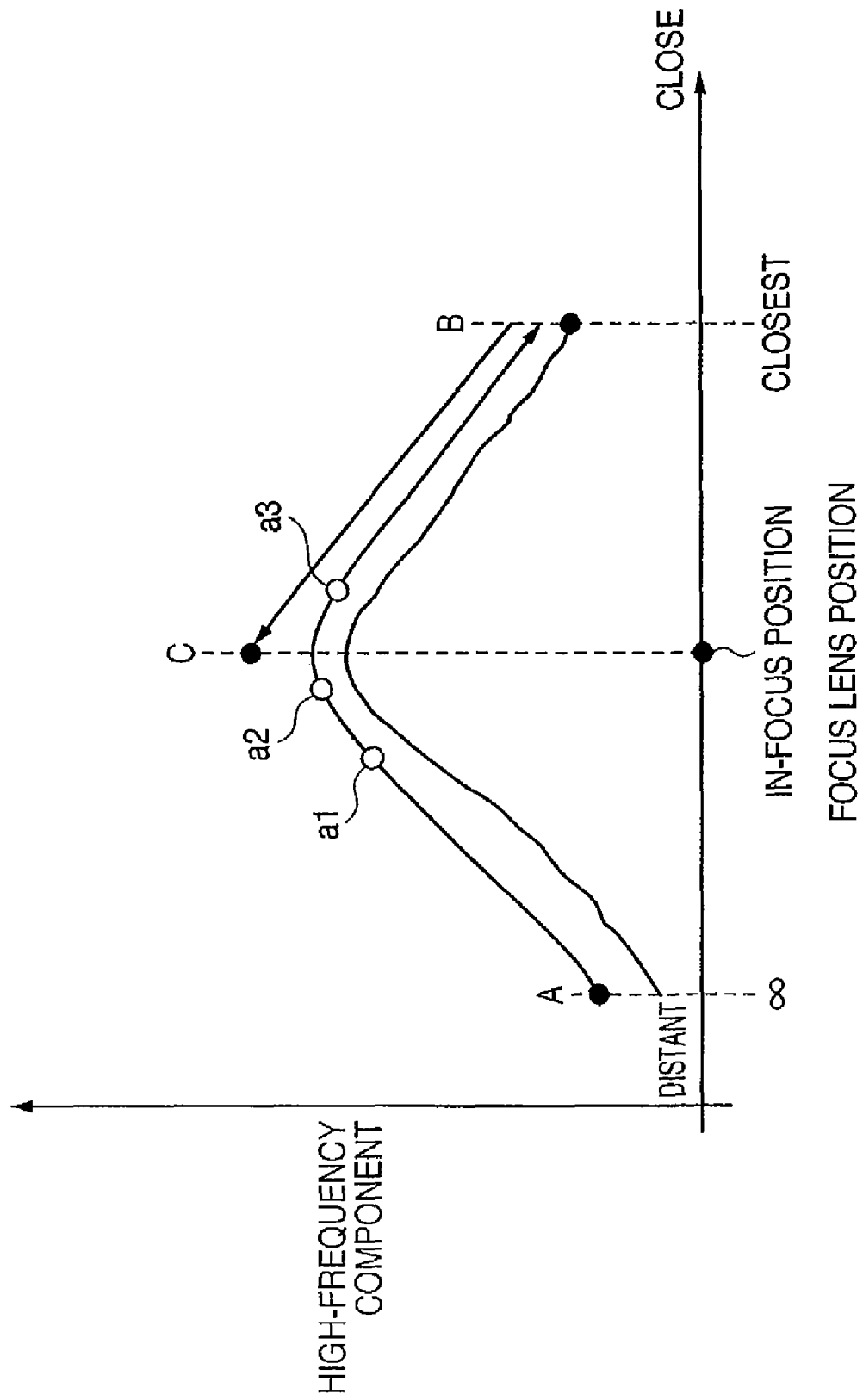
FIG. 3 is a schematic diagram for describing auto focus processing.

AF processing is performed by obtaining a position of the focus lens group 3, where the high-frequency component outputted by an image signal generated by the CCD 5 is maximized. The CPU 15 controls the focus drive motor 22 via the second motor drive circuit 19 to move the focus lens group 3 to a position corresponding to infinite distance, "A" in FIG. 3. A scan range from the infinite distance position to a position corresponding to the closest distance that is set in each image sensing mode, "B" in FIG. 3, is scanned at a preset scanning interval. A focus evaluation value is acquired by the AF processing circuit 14 at each scan point. Once driving of the focus lens group 3 is concluded, a position where the high-frequency component is maximized or, in other words, an in-focus position, "C" in FIG. 3, is obtained from the acquired focus evaluation values, whereby the focus lens group 3 is moved to the obtained position.

For purposes of speeding up scan AF processing, the scan interval of step S4 is set so that one or more stoppable positions of the focus lens group 3 are skipped in each scan interval, not stopping all of the stoppable positions. In such a circumstance, as shown in FIG. 3, it is possible that the actual acquisition of the focus evaluated value will take place, not at a point where the focus evaluated value is maximized, but instead at points a1, a2, and a3, before and after the point where the focus evaluation value is maximized. In such a circumstance, an in-focus position C will be obtained by calculation from the point where the focus evaluation value is maximized and the points therebefore and thereafter, among the acquired focus evaluation values.

Reliability of the focus evaluation values is evaluated before calculating an in-focus position. If the reliability is sufficient, a point where the focus evaluation value is maximized is calculated, and "AF OK" is displayed. The display is performed by, inter alia, illuminating the display element 29, and at the same time displaying a green frame on the LCD 10. In addition, if the evaluation of the reliability of the focus evaluation values results in low reliability, processing for calculating a point where the focus evaluation value is maximized is not performed, and "AF NG" is displayed. The display is performed by, inter alia, blinking the display element 29, and at the same time displaying a yellow frame on the LCD 10. It goes without saying that the preceding display methods and modes are merely exemplary, and are by no means restrictive.

After concluding AF processing performed in thereby, the CPU 15 checks in step S5 whether SW1 is still turned on. If not, the sequence returns to step S2, and if so, the sequence proceeds to step S6 to verify SW2. If SW2 is turned off, the sequence returns to step S5. If SW2 is turned on, the sequence proceeds to step S7.

In step S7, the value of a continuous shooting counter N that counts the number of shots in is initialized to 1. In step S8, exposure processing for recording an object image is executed. Per the foregoing, the image signal obtained from the CCD 5 through exposure is stored in the storage memory 12 via the image sensing circuit 6, the A/D converter circuit 7, the VRAM 8, and the compression/expansion circuit 11.

Once exposure processing is concluded, the value of the continuous shooting counter is incremented by 1 in step S9, and verification of SW2 is once again performed in step S10. If SW2 is turned off, the sequence proceeds to step S12 to wait for SW1 to be turned off, and the sequence terminates.

On the other hand, if SW2 has remained turned on, the sequence proceeds to step S11 to judge whether continuous shooting has been instructed. If continuous shooting has not been instructed, the sequence returns to step S10 to wait for SW2 to be turned off, and once SW2 is turned off, the sequence waits in step S12 for SW1 to be turned off and subsequently concludes processing. If continuous shooting has been instructed, AF processing (AF processing between continuous shooting) that is performed between image sensings is performed in step S13. The sequence then returns to step S8 to perform exposure processing.

The AF processing between continuous shooting is performed when continuous shooting is instructed by the photographer. If continuous shooting is not instructed, in a case where, for instance, single shot image sensing mode has been specified by the photographer, after conclusion of exposure processing of step S8, the status of SW2 is checked in step S10. If it is found in step S10 that SW2 remains turned on, the sequence stands by for SW2 to change be turned off. In other words, in steps S9 to S13, the exposure processing of step S9, the incrementing of the continuous shooting counter of step S10 and the AF processing between continuous shooting of step S13 will not be performed. In step S6, if SW2 has not been turned off, the sequence waits for SW2 to be turned on. However, if SW1 is turned off herein, the sequence returns to step S1.

Figure 4:
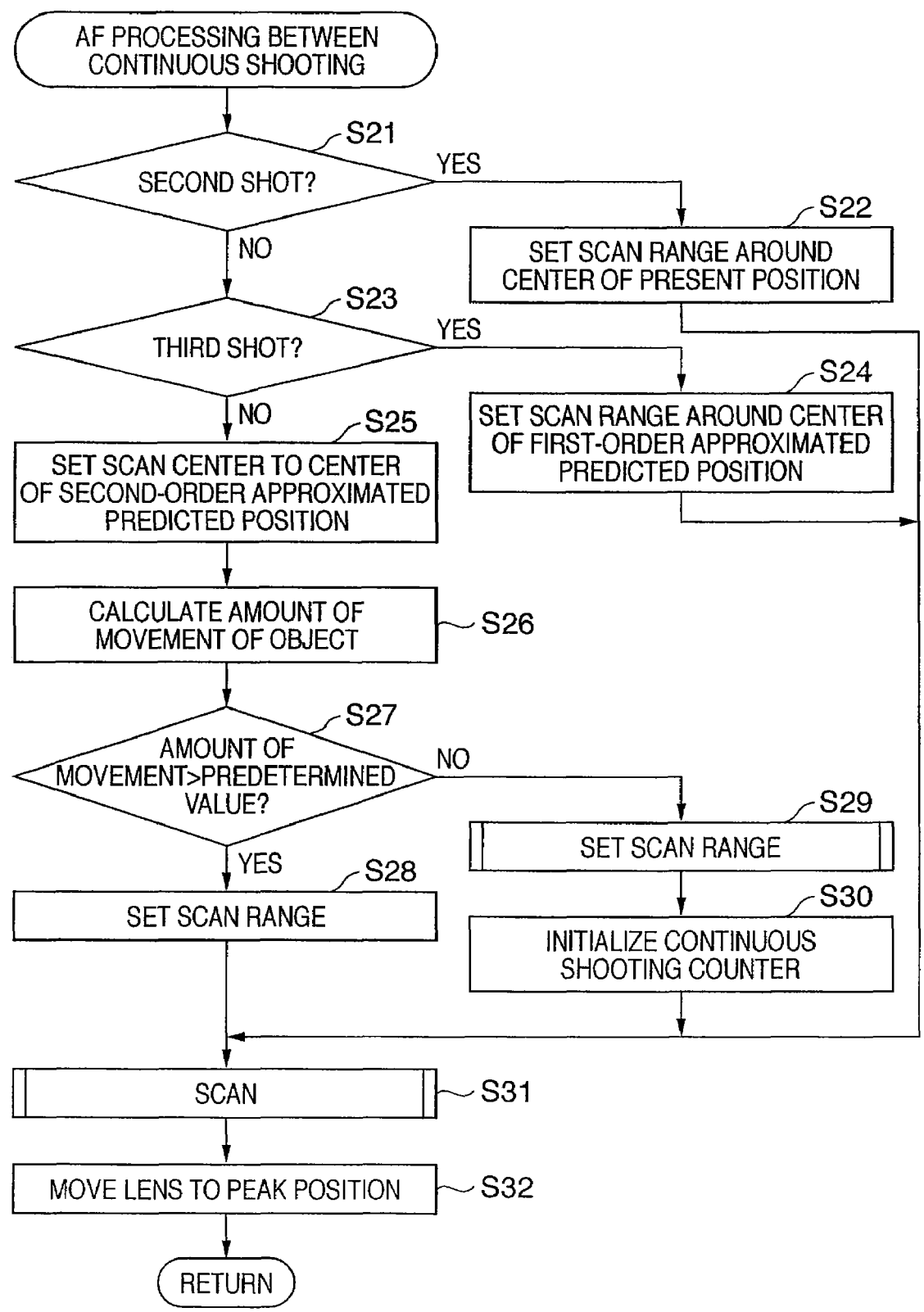
FIG. 4 is a flowchart showing a procedure of AF processing between continuous shooting according to the first and the second embodiments of the present invention.

Following is a detailed description of AF processing between continuous shooting performed in step S13, with reference to FIG. 4.

Since the processing is only executed for the second and subsequent shots of continuous shooting, the initial execution of the processing corresponds to the processing of the second shot of continuous shooting. In addition, the value of the continuous shooting counter N herein is 2.

In step S21, the sequence checks whether the present image sensing is the second shot of the continuous shooting. If it is the second shot, i.e., if the value of the continuous shooting counter N is 2, the sequence proceeds to step S22. If not, the sequence proceeds to step S23.

In step S22, the position of the focus lens group 3 at the time of image sensing of the first shot of continuous shooting, i.e., in-focus position FP1, is set as the center ObjP2 of a scan range. A scan range is further set by prioritizing that the image sensing intervals between sequential image sensings will not be extended. More specifically, the number of scan points is determined in consideration of the read out time of image signals from the CCD 5, and the checking time required for the next image sensing operation or the like, so that AF operations conclude between image sensings. In addition, a scan interval is set that enables AF operations, i.e., in-focus position retrieval to be performed. In other words, the scan range may be expressed as the product of (number of scan points −1) times the scan interval. However, when the set scan range exceeds the entire range, i.e., the range between the closest distance and the infinite distance at which focusing is to be achieved, the entire range is set as the scan range. Furthermore, when the end of the set scan range exceeds the closest distance or the infinite distance at which focusing is possible, the scan range is shifted so that the scan range does not exceed the closest distance or the infinite distance where focusing is possible.

Once setting of the scan range is concluded, the sequence proceeds to step S31.

On the other hand, if the present shot is not the second shot, the sequence checks in step S23 whether the present shot is the third shot of the continuous shooting, i.e., whether the value of the continuous shooting counter N is 3. If so, the sequence proceeds to step S24.

If the present shot is the third shot, information regarding two in-focus positions FP1 and FP2 corresponding to the first and second shots of the continuous shooting exists as in-focus position history information. Thus, in step S24, assuming that the time between sequential image sensings is constant, an object position is predicted, i.e., an in-focus position for an image sensing of the third shot is predicted, using first-order approximation from information regarding the two in-focus positions, and a central position ObjP3 of a scan range is calculated using Formula (1).

$$ObjP3 = FP2 + (FP2 - FP1) \times FpAdj3 \qquad (1).$$

The parameter FpAdj3 weights an object position prediction result and the last in-focus position, and has a value ranging from 0 to 1. In FIGS. 6A and 6B, which depict focus lens positions, FpAdj3 is set to 1. Thus, a scan range is set based on the central position ObjP3 calculated as per the foregoing, and the scan range is shifted in the direction in which the object image moves from the previous scan range. A scan range is thus set in the same manner as in step S22, by prioritizing that the image sensing intervals between sequential image sensings will not be extended. The sequence then proceeds to step S31.

When it is found in step S23 that the present shot is the fourth or subsequent shot of the sequential image sensing, the sequence proceeds to step S25. In the present circumstance, since the present shot is the fourth or subsequent shot, information regarding at least three in-focus positions, FP1, FP2, and FP3, respectively used for image sensings, exists as in-focus position history information. Per the foregoing, since the time interval between sequential image sensings is constant, an object position is predicted, i.e., an in-focus position at the time of the present image sensing is predicted, using second-order approximation. For instance, the central position ObjP4 of the scan range when performing image sensing on the fourth shot may be calculated by Formula (2)

$$ObjP4 = (FP1 - 3FP2 + 3FP3) \times FpAdj4 + FP3(1 - FpAdj4) \quad (2)$$
$$= (FP1 - 3FP2 + 2FP3) \times FpAdj4 + FP3$$

The parameter FpAdj4 weights an object position prediction result and the last in-focus position, and has a value ranging from 0 to 1. Additionally, in the present circumstance, unlike up to the third shot, the scan range is not set.

In step S26, the absolute value of the difference between the in-focus position FP3 of the image sensing of the third shot and the calculated central position ObjP4 is obtained to be used as the amount of movement of the object in the direction of the optical axis. For the fifth and subsequent shots, the absolute value of the difference between a calculated central position and the in-focus position at the immediately preceding image sensing is used as the amount of movement.

In step S27, a judgment is made as to whether the object is significantly moving in the direction of the optical axis by comparing the amount of movement of the object in the direction of the optical axis, which is calculated in step S26 with a predetermined value. As a result, when the amount of movement of the object in the direction of the optical axis exceeds the predetermined value, the sequence proceeds to step S28 to set a scan range. The setting method used in such a circumstance is the same as per steps S22 and S24, and setting is performed by prioritizing such that the image sensing intervals between sequential image sensing will not be extended. The sequence proceeds to step S31.

On the other hand, if the amount of movement of the object in the direction of the optical axis equals or is less than the predetermined value, the sequence proceeds to step S29 to set a scan range. In such a circumstance, in order to remove adverse effects caused by a phenomenon such as described hereinafter, wherein a moved main object falls out of the scan range, setting is performed so as to include the moved main object in the scan range.

For instance, when the background makes up a significant portion of the AF area at the time of the image sensing of the first shot, a circumstance may arise where the background is brought into, and will remain in, focus. An example thereof is a case where the high proportion of the background to the AF area brings the background into focus during image sensing of the first shot, and the background subsequently remains in focus, instead of the main object, because the proportion of the background to the AF area remains high. When the main object moves and the proportion of the background to the AF area increases, the moved main object will fall out of the scan range set in step S24 and the like, thereby preventing the main object from coming into focus.

In consideration thereof, the predetermined value used for comparison in step S27 will be used to judge whether the results of AF processing between continuous shots cause to keep focusing on the background. The value will enable determination that the object has not moved, in consideration of detection errors of in-focus positions and predicted positions.

A scan range is set in step S29. In such a circumstance, since it is determined that the object is not moving significantly, focus accuracy is emphasized over continuous shooting speed. Therefore, in order to accurately bring the object into focus, a scan range is set which is around 1 to 3 times the scan range set in step S28, for instance.

Figure 5:
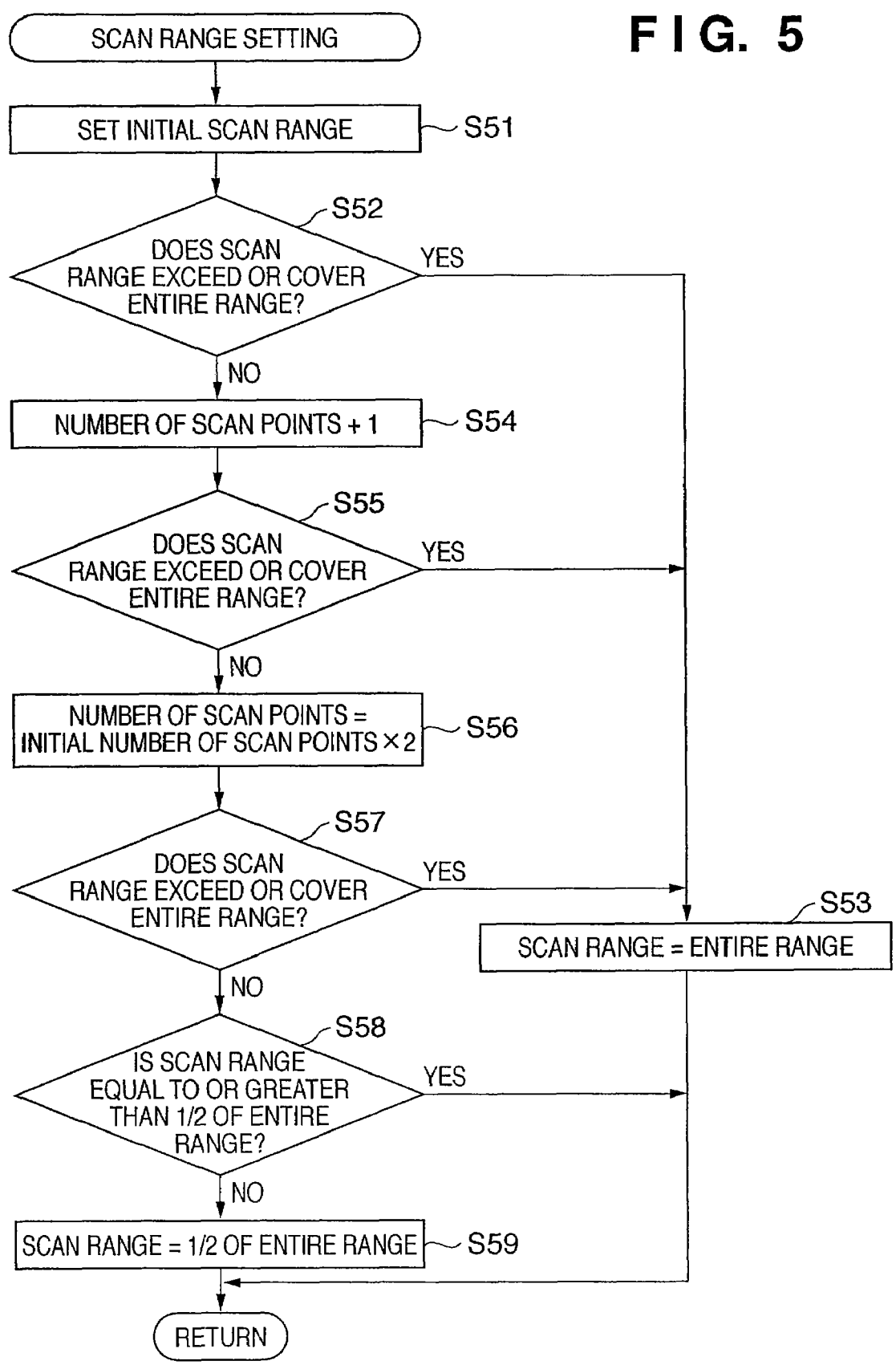
FIG. 5 is a flowchart showing a procedure of scan range setting processing according to the first embodiment of the present invention.

More specifically, setting is performed in the following manner. FIG. 5 shows a procedure of scan range setting processing performed in step S29 in FIG. 4.

In step S51, an initial scan range is set. The process is performed in the same manner as in step S28, by determining a number of scan points so that AF operations conclude during image sensing, and by further setting a scan interval that enables AF operations, i.e., in-focus position retrieval to be performed. The scan range will be the product of (number of scan points −1) and the scan interval. In step S53, the entire range will be used as the scan range either when the scan range thus set exceeds the entire range, i.e., the range between the closest distance and the infinite distance in which focusing is to be achieved (YES in step S52) or when the entire range may be covered by shifting the scan range.

When the preceding setting is unable to cover the entire range "(NO in step S52), in step S54, the number of scan points is incremented by 1, without changing the scan interval. When the scan range, determined as the product of (number of scan points −1) and the scan interval, exceeds the entire range or when the entire range may be covered by shifting the scan range (YES in step S55)", the entire range will be used as the scan range (step S53).

When the entire range cannot be covered even by incrementing the number of scan points by 1, in step S54, the number of scan points is set to double the number of scan points prior to incrementing thereof by 1, i.e., initial number of scan points, without changing the scan interval. When the scan range, determined as the product of (number of scan points −1) and the scan interval, exceeds the entire range, or when the entire range may be covered by shifting the scan range (YES in step S57), the entire range will be used as the scan range (step S53).

When the entire range is not covered, a judgment is made in step S58 as to whether the set scan range equals or exceeds ½ of the entire range. If so, the scan range that is set at that point, i.e., double the initial scan range, will be used as the scan range without modification. On the other hand, if the set scan range in step S58 is less than ½ of the entire range, ½ of the entire range will be used as the scan range (step S59).

Upon conclusion of scan range setting processing that is performed as per the foregoing, the procedure returns to FIG. 4 to initialize the continuous shooting counter to 1, in step S30. As a result, when it is determined that the object has not moved because, inter alia, the background remains in focus, image sensing performed thereupon is treated as an image sensing of the first shot, although the present shot is not actually the first shot in the continuous shooting. Therefore, the next image sensing will be treated as an image sensing of the second shot. The same applies for subsequent image sensings.

After the preceding processing is concluded, the sequence proceeds to step S31. In step S31, scanning is performed according to the flowchart shown in FIG. 7, to be described hereinafter, to calculate a peak value of focus evaluation values, and in step S32, the focus lens group 3 is moved to a peak position, i.e., an in-focus position, that is a position of the focus lens corresponding to the calculated peak value.

In like manner, for sequential image sensing of a fifth and subsequent shots, i.e., where the value of the continuous shooting counter N is greater than or equal to 5, an object position is predicted, i.e., an in-focus position at the time of the present image sensing is predicted, in step S25 of FIG. 4, using second-order approximation, and the central position ObjP(n) of the scan range is calculated using Formula (3), following. Thus, a scan range is set based on a central position ObjP(n) calculated as per the foregoing, and the scan range is shifted from the previous scan range in the direction in which the object image moves.

$$ObjP(n) = (FP(n-3) - 3FP(n-2) + 2FP(n-1)) \times FpAdj(n) + FP(n-1) \quad (3).$$

However, as per the image sensing of the fourth shot, when the amount of movement of the object is less than or equal to a predetermined value, the sequence proceeds from step S29 to step S30, and sets a scan range such that the object is reliably brought into focus.

Although performing such processing will result in a decrease in the number of shots on which image sensing is performed per a unit time of the continuous shooting speed, the main object will be reliably brought into focus. Since continuous shooting speed, i.e., the number of shots on which image sensing is performed per unit time, is not a problem, comparatively speaking, when the object is actually not moving or, even when moving, not moving significantly, a wide scan range may thus be set. The reason is that, with an object with little movement, the position of a main object within the screen during scanning remains almost unchanged, and in many cases object movement is minimal, even when the image sensing interval of continuous shooting is relatively wide.

Per the foregoing, it is possible to remove adverse effects caused by the preceding reasons wherein the background is brought into focus instead of a moved main object.

Following is a description of the foregoing operations, with reference to FIGS. 6A and 6B. FIG. 6A shows an example where the focus follows the main object, while FIG. 6B shows an example where the focus does not follow the main object during the initial stage of sequential image sensing, because the background was first brought into focus.

Following is a description using a scene shown in FIG. 6A as an example. The parameter FpAdj(n) shown in Formula (1) is a parameter for weighting an object position prediction result and the last in-focus position, and has a value ranging from 0 to 1. In FIGS. 6A and 6B, which show the focus lens positions, FpAdj(n) is set to 1.

When SW1 is turned on to initiate the series of image sensing operations, an in-focus position FP1 of the image sensing of the first shot is determined by the AF processing performed in step S4 in FIG. 2.

As described with reference to step S22, as shown in FIG. 4, for the AF processing for the second shot of the continuous shooting performed in step S13 of FIG. 2, the in-focus position FP1 of the first shot will be used as the predicted moved position ObjP2 of the object at the time of image sensing of the second shot. Per the foregoing, a scan range, i.e., the range of the arrow depicted in FIG. 6A, is set based on the predicted moved position ObjP2, and scanning is performed in the scan range. As a result, an in-focus position FP2 of the second shot is determined.

For AF processing between continuous shooting for the third shot, as described with reference to step S24 shown in FIG. 4, a predicted moved position ObjP3 of the object, at the time of image sensing of the third shot, is determined from the in-focus position FP1 of the first shot and the in-focus position FP2 of the second shot, using Formula (1). A scan range is set in the same manner as in the image sensing of the second shot, and scanning is performed in the scan range. As a result, an in-focus position FP3 of the third shot is determined.

For AF processing between continuous shooting for the fourth shot, as described with reference to step S25 shown in FIG. 4, a predicted moved position ObjP4 of the object at the time of image sensing of the fourth shot is determined from the respective in-focus positions FP1, FP2, and FP3 of the first, second, and third shots, using Formula (2). An amount of movement of the object in the direction of the optical axis, i.e., the absolute value of the difference between the in-focus position FP3 of the image sensing of the third shot and the central position ObjP4 of the scan range at the time of the image sensing of the fourth shot, is then determined.

As shown in FIG. 6A, when the value is greater than or equal to a predetermined value, the scan range is set so as to be centered around the predicted moved position ObjP4 of the object, and scanning is performed in the scan range. As a result, an in-focus position FP4 of the fourth shot is determined.

In-focus positions are determined in the same manner for subsequent image sensings. More specifically, for the image sensing of an nth shot, a predicted moved position ObjPn of the object at the time of image sensing of the nth shot is determined from respective in-focus positions of the n−3th, n−2th, and n−1th shots, using Formula (3). An amount of movement of the object in the direction of the optical axis, i.e., the absolute value of the difference between the in-focus position FP(n−1) of the image sensing of the n−1th shot and the central position ObjPn of the scan range at the time of the image sensing of the nth shot, is then determined. If the value is greater than or equal to a predetermined value, the scan range is set so as to be centered around the predicted moved position ObjPn of the object, and scanning is performed in the scan range to determine an in-focus position FPn.

On the other hand, as shown in FIG. 6B, when the absolute value of the difference between the in-focus position FP3 of the image sensing of the third shot and the central position ObjP4 of the scan range at the time of the image sensing of the fourth shot, is less than the predetermined value, it is possible that, for instance, the motionless background has been brought into focus, as per the foregoing. Accordingly, the scan range is set so that the object may reliably be brought into focus. In doing so, the scan range is set as a range that is 1 to 3 times the scan range when the amount of movement of the object is greater than or equal to the predetermined value. Scanning is then performed. As a result, an in-focus position FP4 is determined as shown in FIG. 6B. Image sensing performed thereupon will be treated as a first shot of sequential image sensing.

When the background is first brought into focus as shown in FIG. 6B, an accurate in-focus position may be obtained by scanning a relatively wide scan range for the image sensing of the fourth shot.

In the case of FIG. 6B, for AF processing between continuous shooting of the fifth shot, the in-focus position FP4 of the fourth shot will be used as the predicted moved position ObjP5 of the object at the time of the image sensing of the fifth shot. A scan range is then set in the same manner as in the image sensing of the second shot, and scanning is performed in the scan range (the range of the arrow depicted in FIG. 6B) to determine an in-focus position FP5.

For AF processing between continuous shooting for the sixth shot, a predicted moved position ObjP6 of the object at the time of image sensing of the sixth shot is determined from the in-focus position FP4 of the fourth shot and the in-focus position FP5 of the fifth shot using Formula (1). A scan range is then set in the same manner as in the image sensing of the third shot, and scanning is performed in the scan range. As a result, an in-focus position FP6 of the sixth shot is determined.

For AF processing between continuous shooting for the seventh shot, a predicted moved position ObjP7 of the object at the time of image sensing of the seventh shot is determined from the in-focus positions of the fourth, fifth and sixth shots using Formula (2). An amount of movement of the object in the direction of the optical axis (the absolute value of the difference between the in-focus position FP6 of the image sensing of the sixth shot and the central position ObjP7 of the scan range at the time of the image sensing of the seventh shot) is then determined.

When this value is equal to or greater than a predetermined value, the scan range is set so as to be centered around the predicted moved position ObjP7 of the object, and AF is performed in the range to determine an in-focus position FP7.

In-focus positions are determined in the same manner for subsequent image sensings.

Figure 7:
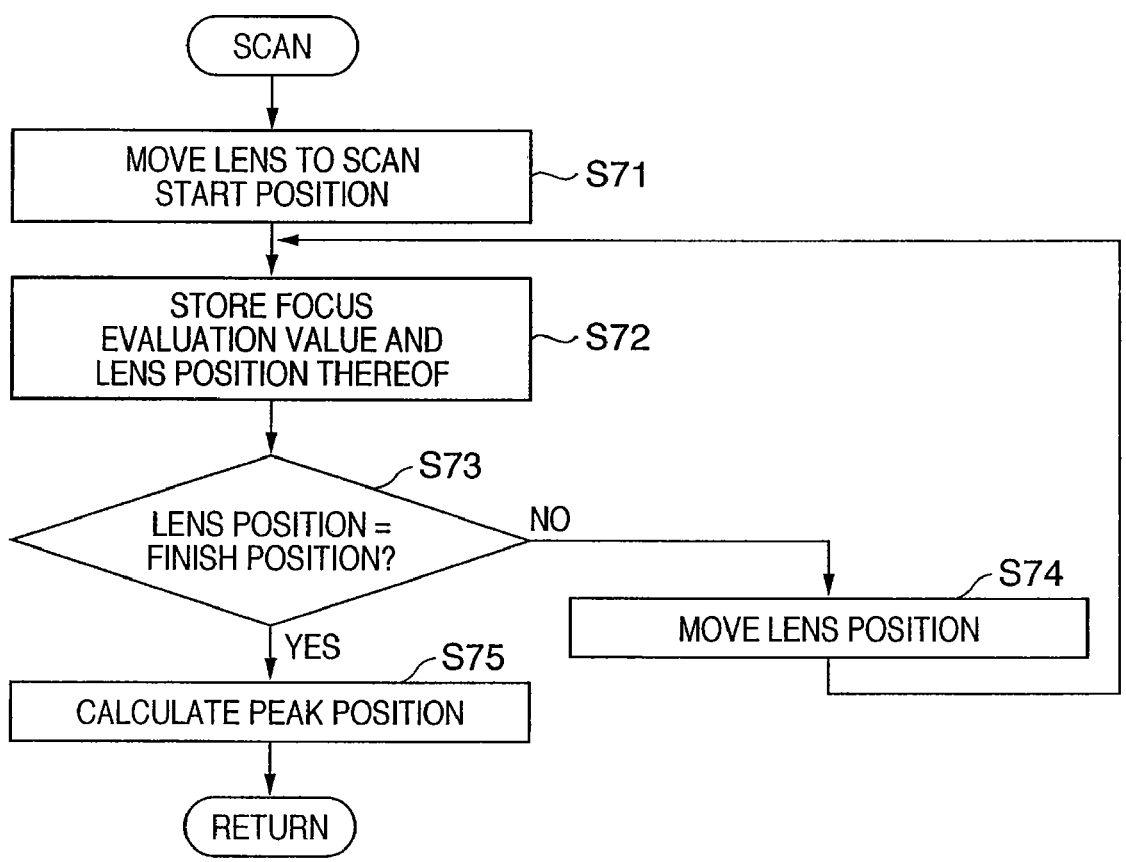
FIG. 7 is a flowchart showing a procedure of scanning processing according to the first and the second embodiments of the present invention.

Next, the scanning operation (step S31) in the flowchart shown in FIG. 4 will be described with reference to the flowchart shown in FIG. 7.

First, in step S71, the focus lens group 3 is moved to a scan start position at a speed that is higher than the scan speed.

In the present first embodiment, the scan start position is set at an end of the set scan range. In step S72, for each scan point, a focus evaluation value of the AF area that is set within the image sensing area and the position of the focus lens group 3 are stored in a processing memory, not shown, which is built into the CPU 15. In step S73, the sequence checks whether the lens position is at a scan finish position. If so, the sequence proceeds to step S75, and if not, proceeds to step S74. The aforementioned scan finish position is set at the other end of the set scan range. In step S74, the focus lens group 3 is driven and moved to the next scan point toward the scan finish position, and the sequence returns to step S72.

Once scanning of the scan range is concluded, in step S75, an in-focus position of the focus lens group 3 corresponding to a position having a maximum focus evaluation value is calculated from the focus evaluation values and lens positions thereof stored in step S72.

As described above, according to the first embodiment, it is possible to remove adverse effects during sequential image sensing in that the background is brought into focus instead of a moved main object, and the main object may be brought into focus more reliably.

While the above first embodiment has been described such that the focus lens group 3 stops at each scan point during scanning, the present invention is not limited to this arrangement. For instance, the apparatus may be controlled to read image signals from the CCD 5 at predetermined time intervals to acquire focus evaluation values while driving the focus lens group 3 at a constant speed.

Second Embodiment

Next, a second embodiment of the present invention will be described.

Figure 8:
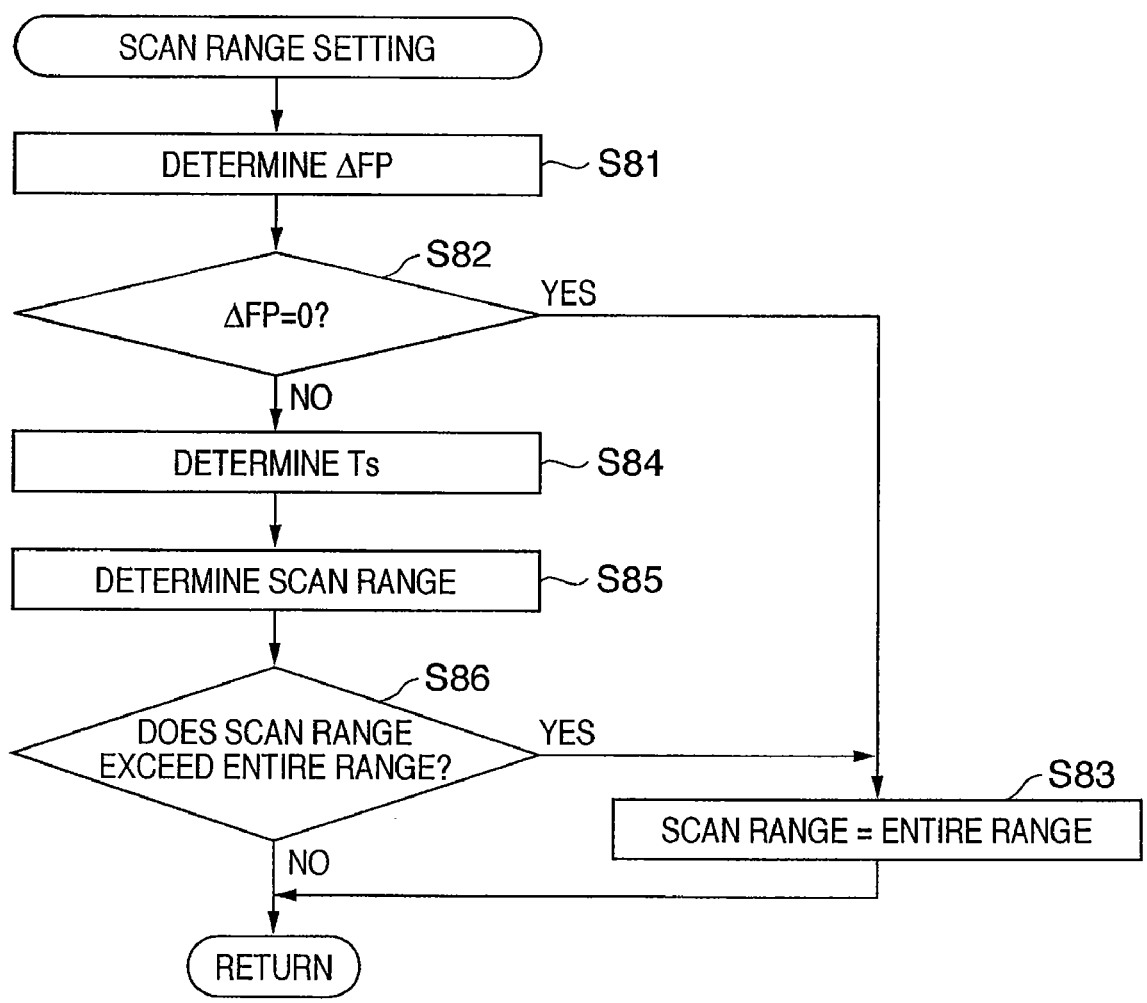
FIG. 8 is a flowchart showing a procedure of scan range setting processing according to the second embodiment of the present invention.

In the second embodiment of the present invention, the method for setting the fourth and subsequent shots in the sequential image sensing of step S29 shown in FIG. 4 is different from the first embodiment. In the second embodiment, when it is judged in step S27 that the amount of movement of the object in the direction of the optical axis is equal to or less than a predetermined value, an allowed time for AF processing between continuous shooting is determined according to the amount of movement and the like, and the number of scan points and scan ranges are set based on the allowed time. Other processing is the same as the processing described for the above first embodiment and a description thereof will be omitted. Processing performed in step S29 according to the second embodiment will now be described with reference to FIG. 8.

First, in step S81, an amount of movement ΔFP is determined. For AF processing between continuous shooting for the fourth shot, a predicted moved position ObjP4 of the object at the time of image sensing of the fourth shot is determined from the in-focus positions FP1, FP2 and FP3 of the first, second and third shots using Formula (2). The absolute value of the difference between this value and the in-focus position FP3 at the time of the image sensing for the third shot is set as the amount of movement ΔFP of the object in the direction of the optical axis.

When ΔFP is "0" (YES in step S82), the entire range is set as the scan range (step S83).

When ΔFP is not "0", an allowed time Ts for AF processing between continuous shooting is determined in step S84 using Formula (4).

$$Ts = Tso \times \Delta FPmax / \Delta FP \qquad (4),$$

where ΔFPmax represents assumed maximum shifting speed of image plane and Tso represents a reference AF time at ΔFPmax. A reference AF time is a time during which the movement amount of image plane of the moving object is equal to or less than a predetermined value or, more specifically, equal to or less than 1 depth. In other words, when the movement amount of image plane is ΔFPmax, since the movement amount of image plane within the reference AF time Tso is equal to or less than 1 depth, the deviation from the in-focus position determined by AF during continuous shooting will be equal to or less than 1 depth. As a result, it is possible to determine that an in-focus state exists.

In step S85, after obtaining the number of scan points Nsp as $$Nsp = INT(Ts/\text{signal read rate}),$$

the number of scan points Nsp is multiplied by a scan interval that enables AF operations (in-focus position retrieval) and a scan range is determined. In this case, INT( ) signifies truncating the fractional part of the value placed in ( ).

When the scan range exceeds the entire range, i.e., the range between the closest distance and the infinite distance in which focusing is to be achieved (YES in step S86), the entire range is set as the scan range (step S83).

As described above, according to the second embodiment, when the object is moving in the direction of the optical axis, it is possible to perform AF processing between continuous shooting within an allowed time for AF during continuous shooting.

While the above second embodiment has been described such that the method for setting scan ranges is changed depending on whether ΔFP is 0 or not, the present invention is not limited to this arrangement. Since judging whether the object is moving in the direction of the optical axis will suffice for the present second embodiment, ΔFP needs not be compared to 0 when in-focus position detection errors and the like are taken into consideration, and ΔFP may instead be compared with a predetermined value as in the first embodiment.

Third Embodiment

Next, image sensing operations performed by the image sensing apparatus 1 according to a third embodiment will be described with reference to the flowchart shown in FIG. 9. The image sensing apparatus 1 of the third embodiment basically has the same configuration as that shown in FIG. 1, with the exception that a CMOS sensor is used as the image sensor 5 in the present third embodiment. In addition, the CCD driver 17 is replaced by a CMOS driver.

Figure 9:
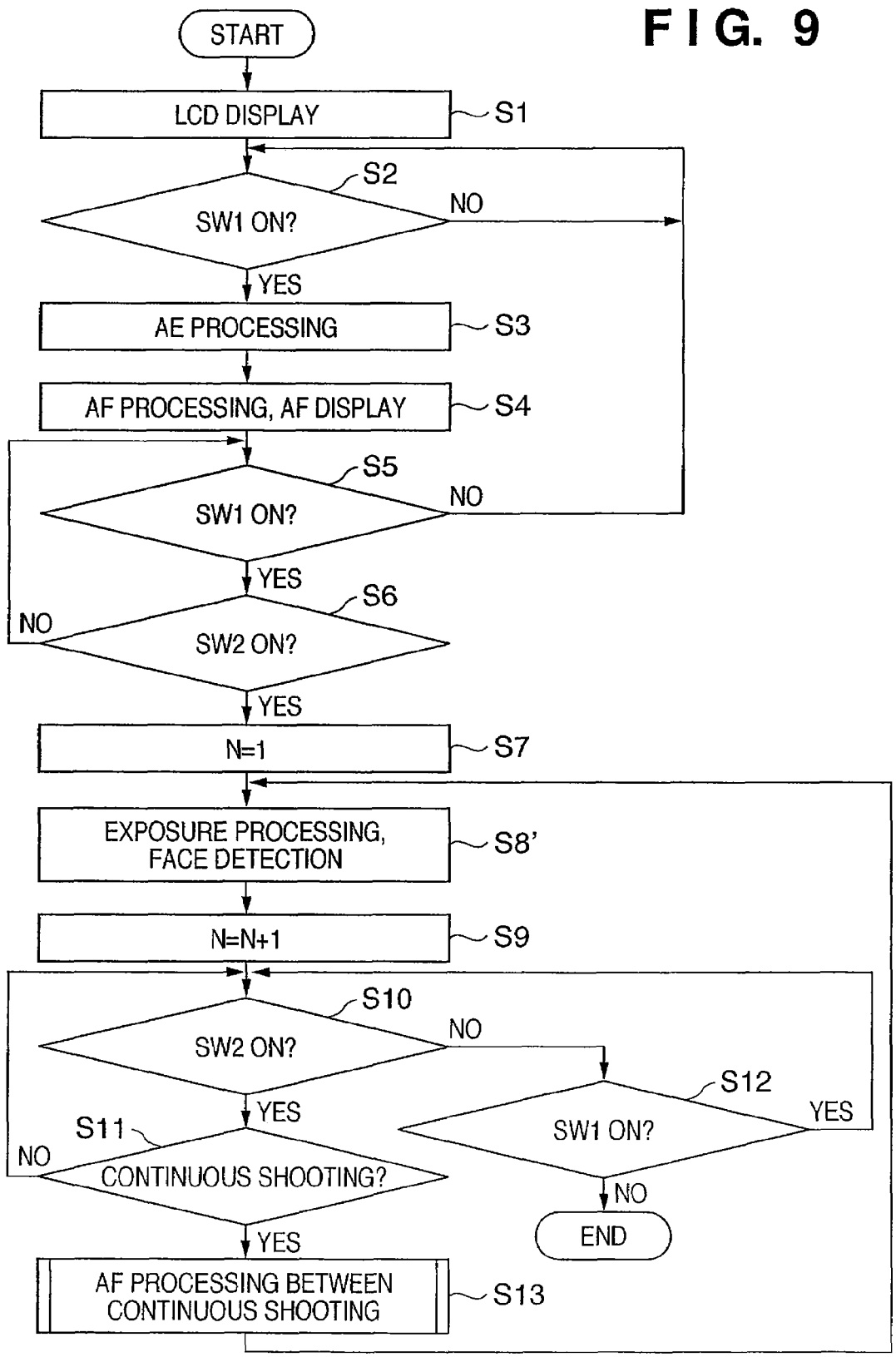
FIG. 9 is a flowchart showing a procedure of image sensing processing according to a third and a forth embodiments of the present invention.

The image sensing processing sequence shown in FIG. 9 is executed when the main power switch of the image sensing apparatus 1 has been turned on and the operation mode of the image sensing apparatus 1 is in image sensing (recording) mode.

The image sensing processing sequence shown in FIG. 9 differs from the image sensing processing sequence shown in FIG. 2 in that face detection is performed along with exposure processing.

In step S8', face detection is performed upon the conclusion of exposure processing. This face detection is performed in order to judge whether the prediction of the movement of the object is correct, and is performed even when a face detection function has been turned off by the photographer. In addition, images prior to exposure and displayed on the EVF are used for face detection. After face detection is performed, the availability of detection (whether face detection was successful) is recorded. In the event that detection is successful, the size and the on-screen position of the detected face are also recorded.

Since processing other than that performed in step S8' is the same as the processing described for the first embodiment with reference to FIG. 2, a description thereof will be omitted.

Figure 10:
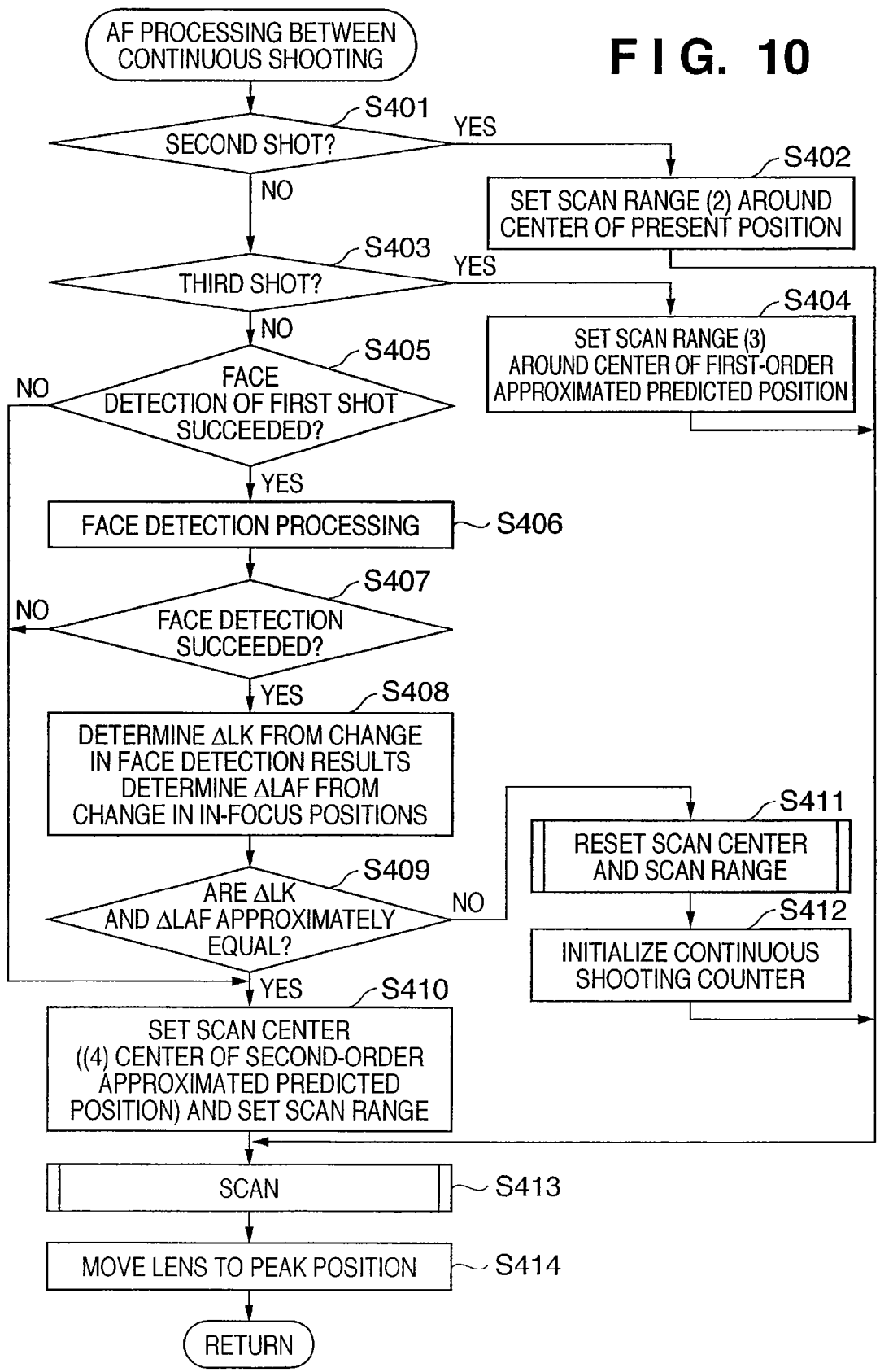
FIG. 10 is a flowchart showing a procedure of AF processing between continuous shooting according to the third embodiment of the present invention.

Details of AF processing between continuous shooting performed in step S13 according to the third embodiment will now be described with reference to FIG. 10.

Since this processing is executed for the second and subsequent shots of continuous shooting, the initial execution of this processing corresponds to the processing of the second shot of continuous shooting. The value of the continuous shooting counter N at this time is 2.

In step S401, the sequence checks whether the present image sensing is for the second shot of the continuous shooting. If it is the second shot (if the value of the continuous shooting counter N is 2), the sequence proceeds to step S402. If not, the sequence proceeds to step S403.

In step S402, the position of the focus lens group 3 at the time of image sensing of the first shot of continuous shooting (in-focus position FP1) is set as the center ObjP2 of a scan range. A scan range is further set by prioritizing that the image sensing interval between sequential image sensings will not be extended. More specifically, the number of scan points is determined in consideration of processing performed during continuous shooting such as the read out time of image signals from the CMOS 5 and the checking time required for the next image sensing operation, so that AF operations conclude between image sensings. In addition, a scan interval is set which enables AF operations (in-focus position retrieval) to be performed. More specifically, the scan range will be the product of (number of scan points −1) and the scan interval. However, when the set scan range exceeds the entire range (the range between the closest distance and the infinite distance in which focusing is to be achieved), the entire range is set as the scan range. Furthermore, when the end of the set scan range exceeds the closest distance or the infinite distance where focusing is possible, the scan range is shifted so that the scan range does not exceed the closest distance or the infinite distance where focusing is possible. If setting of the scan range is concluded, the sequence proceeds to step S413.

On the other hand, if the present image sensing is not the second shot, the sequence checks in step S403 whether the present image sensing is the third shot of the continuous shooting (whether the value of the continuous shooting counter N is 3). If so, the sequence proceeds to step S404. If not, the sequence proceeds to step S405. If the present shot is the third shot, information regarding two in-focus positions (FP1, FP2) corresponding to the first and second shots of the continuous shooting exists as in-focus position history information. Thus, in step S404, assuming that the time between sequential image sensings is constant, an object position is predicted (an in-focus position for an image sensing of the third shot is predicted) using first-order approximation from information regarding the two in-focus positions, and a central position ObjP3 of a scan range in which an in-focus state is predicted is calculated by Formula (1).

$$ObjP3 = FP2 + (FP2 - FP1) \times FpAdj3 \qquad (1).$$

In this case, the above-described position where an in-focus state is predicted (predicted in-focus position) indicates a position and/or group of positions of the focus lens group 3 such as the central position of the scan range that is predicted to come into focus at the time of the next image sensing.

Figure 12B:
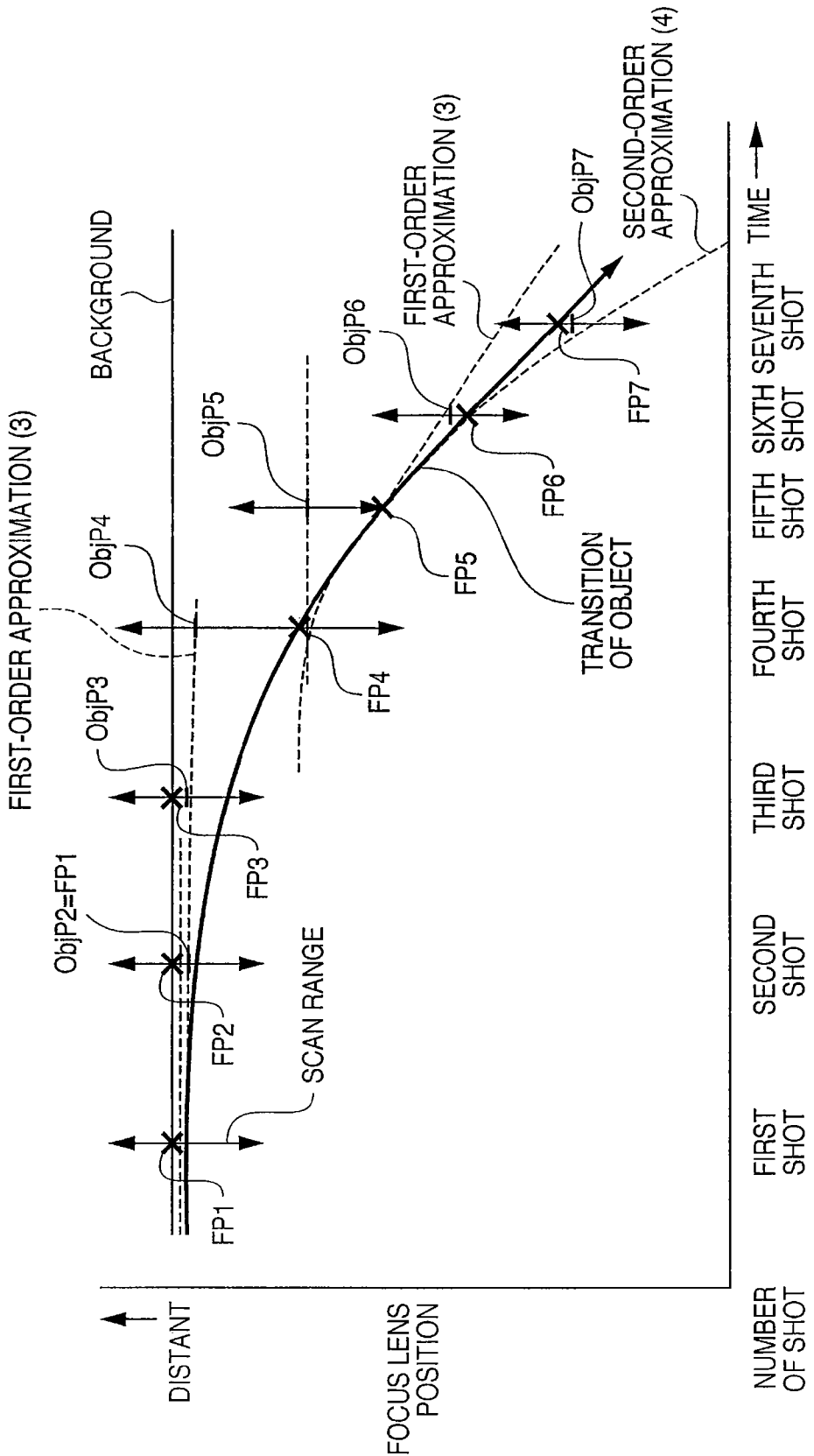

The parameter FpAdj3 is for weighting an object position prediction result and the last in-focus position, and has a value ranging from 0 to 1. In FIGS. 12A and 12B which depict focus lens positions, FpAdj3 is set to 1. A scan range is set based on a central position ObjP3 calculated as described above, and the scan range is shifted in the direction in which the object image moves from the previous scan range. A scan range is set in the same manner as in step S402 by prioritizing that the image sensing intervals between sequential image sensings will not be extended. The sequence then proceeds to step S413.

In step S405, the sequence checks whether face detection immediately prior to the image sensing of the first shot has succeeded. If the face detection immediately prior to the image sensing of the first shot has succeeded, the sequence proceeds to step S406. If the face detection immediately prior to the image sensing of the first shot has not succeeded, the sequence proceeds to step S410 to set a scan range, and subsequently proceeds to step S413. In other words, the fact that face detection immediately prior to the image sensing of the first shot was not successful means that it is highly likely that the object is not a person. Thus, judgment on whether prediction of movement of the object based on the face detection result is correct will not be performed. This is because, even if a face is detected, the accidentally detected face is likely to be the face of a person who is not a main object, and there is a concern that the use of the face detection result may cause an erroneous judgment.

In step S410, since the present image sensing is for the fourth or subsequent shot, information regarding at least three in-focus positions FP1, FP2 and FP3 exist as in-focus position history information. Therefore, assuming that the time intervals between sequential image sensings are constant, an object position is predicted (in-focus position at the time of the present image sensing is predicted) using second-order approximation. For instance, the central position ObjP4 of the scan range when performing image sensing on the fourth shot may be calculated by Formula (2). A scan range is set based on the central position ObjP4 calculated as described above, and the scan range is shifted in the direction in which the object image moves from the previous scan range.

$$ObjP4 = (FP1 - 3FP2 + 3FP3) \times FpAdj4 + FP3(1 - FpAdj4) \quad (2)$$
$$= (FP1 - 3FP2 + 2FP3) \times FpAdj4 + FP3.$$

The scan range is set in the same manner as set in steps S402 and S404, and setting is performed by prioritizing that the image sensing intervals between sequential image sensing will not be extended. The sequence then proceeds to step S413.

In steps S406 to S408, a change in distance to the object is obtained from the face detection results (face information), and a change in the distance to the object is also obtained from a change in in-focus positions. First, in step S406, face detection is performed using the image, displayed as an image on the LCD 10, which is immediately prior to the image sensing of the third shot. Then, in step S407, the sequence checks whether face detection has succeeded. If face detection has succeeded, the sequence proceeds to step S408, and if not, the sequence proceeds to step S410. In step S408, the size and the on-screen position of the detected face are obtained. In turn, the change in distance to the object is obtained from the face sizes. If face sizes respectively obtained from images immediately prior to the first and third shots are represented by Size(1) and Size(3) and the distance to the object at the time of the first shot is represented by L(1), a distance change ΔLK may be expressed as $$\Delta LK = Size(I)/Size(3) \times L(1) - L(1)$$

The distance to the object at the time of image sensing can be obtained from an in-focus position. Conversion from an in-focus position to an distance to the object is performed by referencing a table indicating the relationship between focus lens positions and distances to in-focus objects which is created based on the results of adjustments performed at the time of the production of the camera. In production, AF is performed for a plurality of distances, and a table indicating the relationship between focus lens positions and distances to in-focus objects is created from the obtained in-focus focus lens positions. If the numbers of faces detected by face detection performed for the first and third shots are both one, the face information of the detected faces is used. On the contrary, if a plurality of faces exist, the faces with the closest on-screen position between the first- and third-shot images is used. If there are a plurality of faces at positions of similar closeness between the images, the face that is closest to the center of the screen will be used.

Furthermore, in step S408, the change in distance to the object from the first shot to the third shot is obtained from the in-focus positions at the time of the image sensings of the first and third shots of the continuous shooting. If the distances to the object of the first and third shots are respectively represented as L(1) and LAF(3), a distance change ΔLAF may be expressed as $$\Delta LAF = LAF(3) - L(1).$$

In step S409, the distance change ΔLK and the distance change ΔLAF respectively obtained in step S408 are compared to each other. As a result, if the difference between the two distance changes is smaller than a predetermined value, it is judged that the prediction of object movement is correct (reliability is high), and the sequence proceeds to step S410 to set a scan center and a scan range. In other words, when the difference between the two distance changes is smaller than the predetermined value, it is judged that the scan center is also appropriate (reliability is high).

If the two distance changes are not substantially equal, the sequence proceeds to step S411 to reset a scan range. In other words, when the difference between the two distance changes is greater than a predetermined value, it is judged that the prediction of object movement is incorrect (reliability is low). At this point, it is also judged that the scan center is also incorrect (reliability is low). As described earlier with respect to the first embodiment, in order to remove adverse effects in that a moved main object will fall out of the scan range and therefore will not be brought into focus, the scan range set at this point need to be set so as to include the moved main object.

Therefore, in step S411, in consideration of focal length, image sensing distance, the assumed movement speed of the object and the like, a scan range that is around 1 to 3 times the scan range set in step S404 is set in order to accurately bring the object into focus. Details of this range setting will be described later with reference to FIG. 11.

Upon conclusion of the processing of step S411, the continuous shooting counter N is initialized to 1 in step S412. As a result, when it is determined that the object has not moved because, inter alia, the background remains in focus, image sensing performed at this point is treated as an image sensing of the first shot, although the present shot is not actually the first shot in the continuous shooting. Therefore, the next image sensing will be treated as an image sensing of the second shot. The same applies for subsequent image sensings.

After the above processing is concluded, the sequence proceeds to step S413. In step S413, scanning is performed according to the flowchart shown in FIG. 7 described above to calculate a peak value from the focus evaluation values, and in step S414, the focus lens group 3 is moved to a peak position that is a position of the focus lens corresponding to the calculated peak value.

For the second and subsequent shots of sequential image sensing, the focus lens group 3 is moved to the previous in-focus position instead of a fixed point even when a not-in-focus state is determined. This is because it is conceivable that the object exists in a similar image plane position during continuous shooting, and therefore, it is more likely that an in-focus image may be obtained by driving the focus lens to the previous in-focus position (focus lens drive position) instead of a fixed point.

Focus control operations during image sensing up to the fourth shot have been described above, a brief description of focus control operations for the fifth and subsequent shots will now be given.

For a fifth and subsequent shots of continuous shooting (the value of the continuous shooting counter N is equal to or greater than 5), an object position is predicted (a peak position at the time of the present image sensing is predicted) using second-order approximation, and a central position ObjP(n) of a scan range is calculated using Formula (3). The scan range is set based on the central position ObjP(n) calculated as described above, and the scan range is shifted in the direction in which the object image moves from the previous scan range.

$$ObjP(n)=(FP(n-3)-3FP(n-2)+2FP(n-1))\times FpAdj(n)+FP(n-1) \quad (3)$$

However, in the same manner as in the image sensing of the fourth shot, when the distance change obtained from in-focus positions is not approximately equal to the distance change obtained from the face detection results, the processing of steps S411 and S412 is performed, and a scan range is reset so that the object is reliably brought into focus.

Although performing such processing will result in a decrease in the number of shots performed per a unit time in the continuous shooting, the main object will be reliably brought into focus. As a result, it is possible to remove adverse effects caused by the above-described reasons in that the background is brought into focus instead of a moved main object.

The above-described operations will now be described with reference to FIGS. 12A and 12B. FIG. 12A shows an example where focus follows the main object, while FIG. 12B shows an example where, since the background was first brought into focus, and the focus does not follow the main object during the initial stage of continuous shooting.

First, a description will be given using a scene shown in FIG. 12A as an example. The parameter FpAdj(n) shown in Formula (1) is a parameter for weighting an object position prediction result and the last in-focus position, and has a value ranging from 0 to 1. In FIGS. 12A and 12B, which show the focus lens positions, FpAdj(n) is set to 1.

When SW1 is turned on to initiate the series of image sensing operations, an in-focus position FP1 of the image sensing of the first shot is obtained by the AF processing performed in step S4 in FIG. 2. Furthermore, face detection is performed using the image displayed immediately prior to exposure.

For AF processing for the second shot of the continuous shooting performed in step S13 of FIG. 2, the in-focus position FP1 of the first shot will be used as a predicted moved position ObjP2 of the object at the time of the image sensing of the second shot. Then, a scan range is set by determining a number of scan points so that AF operations conclude between image sensings and by further setting a scan interval that enables AF operations (in-focus position retrieval) to be performed. The scan range will be the product of (number of scan points −1) and the scan interval. The entire range (the range between the closest distance and the infinite distance in which focusing is to be achieved) will be used as the scan range either when the scan range set in this manner exceeds the entire range or when the entire range may be covered by shifting the scan range. Focus control (AF processing) is performed in the scan range (the ranges of the arrows depicted in FIGS. 12A and 12B) set in this manner. As a result, an in-focus position FP2 is obtained.

For AF processing for the third shot of the continuous shooting, a predicted moved position ObjP3 of the object at the time of image sensing of the third shot is obtained from the in-focus position FP1 of the first shot and the in-focus position FP2 of the second shot using Formula (1). A scan range is then set in the same manner as in the image sensing of the second shot, and AF is performed in the set scan range (the ranges of the arrows depicted in FIGS. 12A and 12B). As a result, an in-focus position FP3 is obtained.

For AF processing for the fourth shot of continuous shooting, the sequence first checks whether face detection performed at the time of the image sensing of the first shot has succeeded. If successful (only a successful case, which is hereby assumed, will be described here), face detection is performed using the image displayed immediately prior to exposure of the third shot. Then, from the respective face detection results (face sizes) Size(1) and Size(3) from the first and third shots as well as L(1) that is the distance to the object at the time of the image sensing of the first shot, a distance change ΔLK may be calculated by $$\Delta LK=Size(1)/Size(3)\times L(1)-L(1).$$

Next, the distance to the object LAF(3) of the third shot is obtained from the in-focus position of the third shot, whereby a distance change ΔLAF may be calculated by $$\Delta LAF=LAF(3)-L(1).$$

In the case of FIG. 6A, since the object is followed properly, ΔLK and ΔLAF may be considered to be approximately equal. Thus, in this case, the scan range (the range of the arrow depicted in FIG. 12A) is set so as to be centered around a predicted moved position ObjP4 of the object, and AF is performed in the scan range. As a result, an in-focus position FP4 is obtained. The predicted moved position ObjP4 is obtained from the in-focus positions of the first, second and third shots using Formula (2). In-focus positions are obtained in the same manner for subsequent image sensings. More specifically, for the image sensing of the nth shot, face detection is performed using the image displayed immediately prior to the exposure of the n−1th shot. A distance change ΔLK is obtained from the face detection result, while a distance change ΔLAF is obtained from the in-focus positions of the first and n−1th shots. When the two distance changes ΔLK and ΔLAF may be considered approximately equal, the scan range (the range of the arrow depicted in FIG. 6A) is set so as to be centered around the predicted moved position ObjP4 of the object, and AF is performed in the scan range. As a result, an in-focus position FPn is obtained.

A predicted moved position ObjPn is obtained from the in-focus positions of the n−3th, n−2th and n−1th shots using Formula (3).

On the other hand, when the object is not properly followed as shown in FIG. 6B, the calculation results of ΔLK and ΔLAF will not be approximately equal. In this case, in consideration of focal length, image sensing distance, the assumed movement speed of the object and the like, a scan range that is around 1 to 3 times the scan range in a case where both distance changes are approximately equal is set in order to accurately bring the object into focus, and AF is performed. As a result, an in-focus position FP4 is obtained as shown in FIG. 6B. Image sensing performed at this point will be treated as a first shot of continuous shooting.

When the background is first brought into focus as shown in FIG. 6B, since it is detected that the difference between ΔLK and ΔLAF is significant and a scan AF will be performed on a relatively wide scan range, an accurate in-focus position may be obtained. In the case of FIG. 6B, for AF processing for the fifth shot of continuous shooting, the in-focus position FP4 of the fourth shot will be used as a predicted moved position ObjP5 of the object at the time of the image sensing of the fifth shot. A scan range is then set in the same manner as in the image sensing of the second shot, and AF is performed in the scan range (the range of the arrow depicted in FIG. 6B) to determine an in-focus position FP5. For AF processing for the sixth shot of continuous shooting, a predicted moved position ObjP6 of the object at the time of image sensing of the sixth shot is obtained from the in-focus position FP4 of the fourth shot and the in-focus position FP5 of the fifth shot using Formula (1). A scan range is then set in the same manner as in the image sensing of the third shot, and AF is performed in the scan range (the range of the arrow depicted in FIG. 6B). As a result, an in-focus position FP6 is obtained. For AF processing for the seventh shot of continuous shooting, a predicted moved position ObjP7 of the object at the time of image sensing of the seventh shot is obtained from the in-focus positions of the fourth, fifth and sixth shots using Formula (2). A distance change ΔLK is obtained from the face detection result, while a distance change ΔLAF is also obtained from the in-focus positions of the fourth and sixth shots. When the two distance changes ΔLK and ΔLAF may be considered approximately equal, the scan range (the range of the arrow depicted in FIG. 6B) is set so as to be centered around the predicted moved position ObjP7 of the object, and AF is performed in the scan range to determine an in-focus position FP7. In-focus positions are obtained in the same manner for subsequent image sensings.

Figure 11:
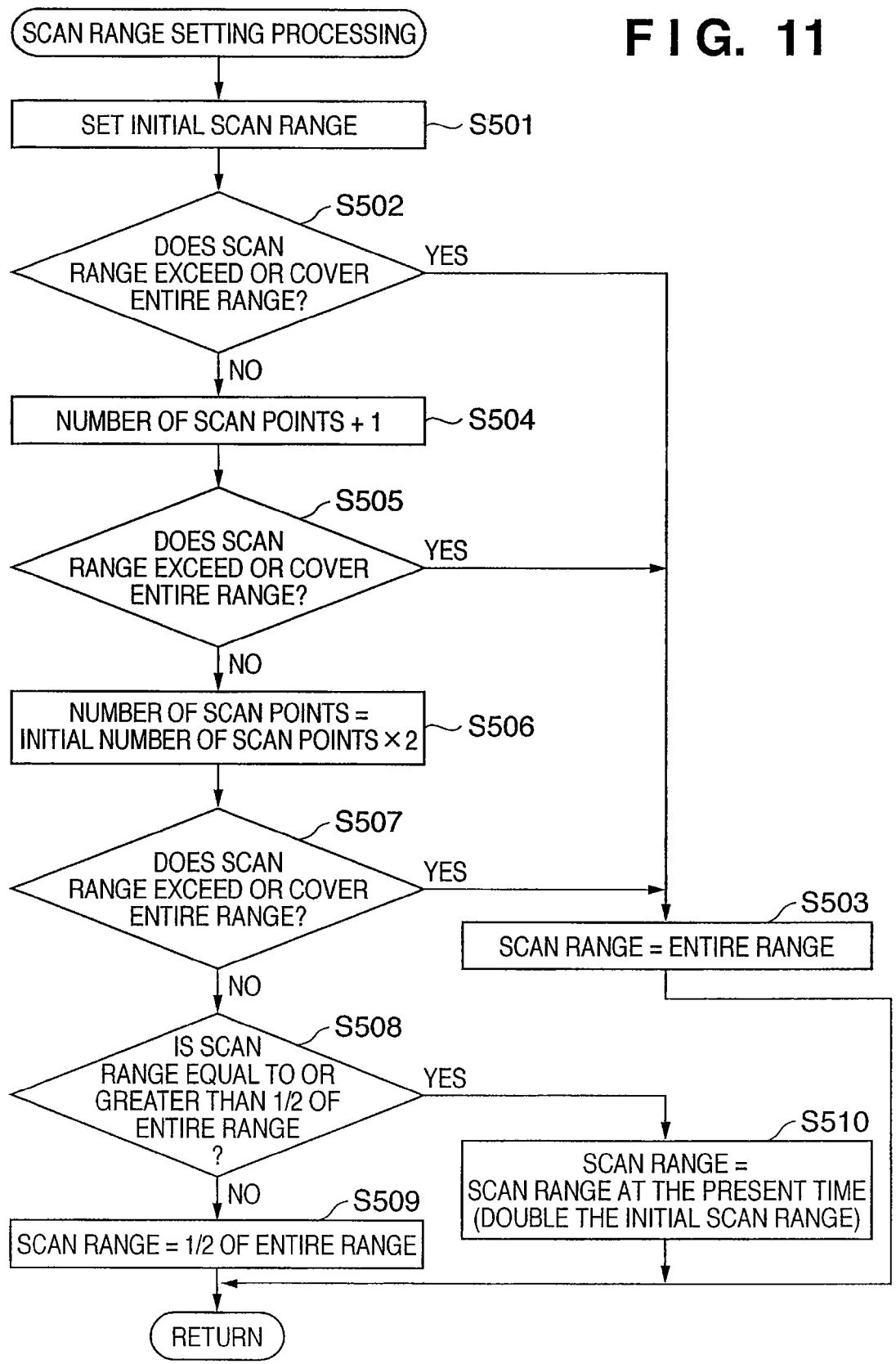
FIG. 11 is a flowchart showing a procedure of scan range setting processing according to the third embodiment of the present invention.

The scan range setting performed in step S411 of FIG. 10 will now be described with reference to FIG. 11. FIG. 11 is a diagram showing procedures of the processing.

First, in step S501, an initial scan range is set.

This is performed in the same manner as in steps S402, S404 and S410 by determining a number of scan points so that AF operations conclude between image sensings and by further setting a scan interval that enables AF operations (in-focus position retrieval) to be performed. The scan range will be the product of (number of scan points −1) and the scan interval. In step S502, the sequence checks whether the scan range set as described above exceeds the entire range or whether the range covers the entire range. The entire range will be set as the scan range either when the calculated scan range exceeds the entire range (the range between the closest distance and the infinite distance in which focusing is to be achieved) or when the entire range may be covered by shifting the calculated scan range (step S503).

When the above setting is insufficient to cover the entire range, the sequence proceeds to step S504. In step S504, the number of scan points is increased by 1 without changing the scan interval. Then, the sequence checks whether the scan range obtained as the product of (the number of scan points −1) and the scan interval exceeds the entire range (the range between the closest distance and the infinite distance in which focusing is to be achieved) or whether the entire range may be covered by shifting the scan range (step S505). If the entire range may be covered, the sequence proceeds to step S503 whereby the entire range is set as the scan range.

On the other hand, when the entire range is not covered even after increasing the number of scan points by 1, the sequence proceeds to step S506. In step S506, the number of scan points is changed to double the number of scan points prior to increasing the same by 1 (initial number of scan points) in step S504 without changing the scan interval. Then, the sequence once again checks whether the scan range obtained as the product of (the number of scan points −1) and the scan interval exceeds the entire range (the range between the closest distance and the infinite distance in which focusing is to be achieved) or whether the entire range may be covered by shifting the scan range. If the entire range may be covered, the sequence proceeds to step S503 whereby the entire range is set as the scan range.

If the entire range is not covered, the sequence proceeds to step S508. In step S508, a judgment is made on whether the set scan range is equal to or greater than ½ of the entire range. If so, the scan range set at that point (double the initial scan range) will be used as the scan range (step S510). If the scan range set in step S508 is less than ½ of the entire range, ½ of the entire range will be used as the scan range (step S509). The processing of step S411 is concluded in the above-described manner.

As described above, according to the third embodiment, it is now possible to remove adverse effects during image sensing in that the background or the like is brought into focus instead of a main object, and the main object may be brought into focus more reliably.

While the third embodiment has been described such that the focus lens group 3 stops at each scan point during scanning, the present invention is not limited to this arrangement. For instance, the apparatus may be controlled to read image signals from the CMOS 5 at predetermined time intervals to acquire focus evaluation values while driving the focus lens group 3 at a constant speed.

Additionally, in the third embodiment, whether the prediction of object movement is correct is judged based on change in face sizes obtained by face detection. However, the present invention is not limited to this arrangement, and the apparatus may be arranged to estimate the distance to an object from the face sizes obtained by face detection, calculate change in distances to the object, and compare thus calculated distance change with a distance change calculated from in-focus positions at the time of image sensing.

Fourth Embodiment

A fourth embodiment of the present invention differs from the third embodiment in that "determination of whether prediction of object movement is correct is made upon conclusion of image sensing of the second shot" and that "a scan center when performing AF during continuous shooting is determined using face detection results".

Figure 13:
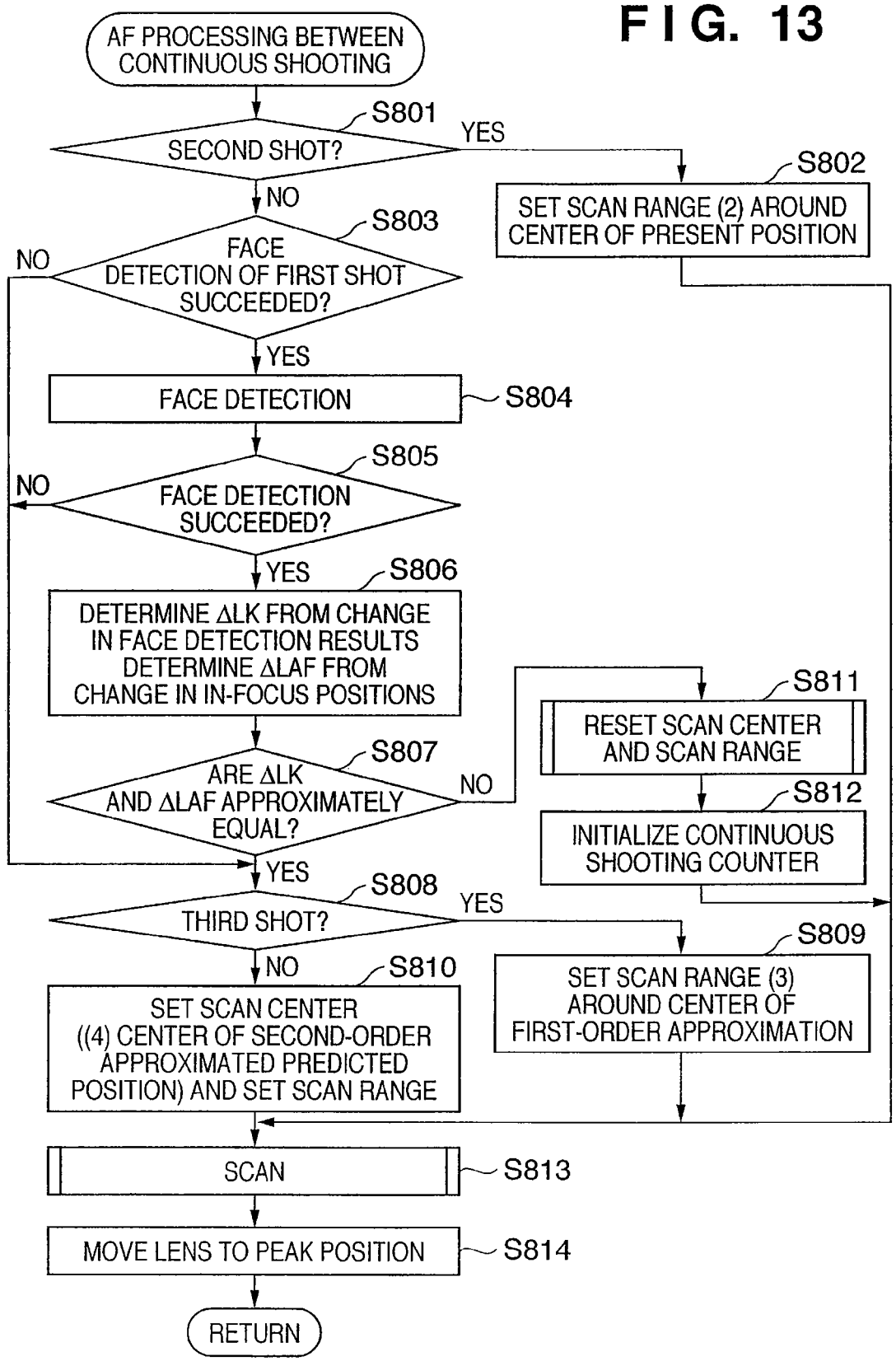
FIG. 13 is a flowchart showing a procedure of AF processing between continuous shooting according to the fourth embodiment of the present invention.

FIG. 13 shows a procedure of AF processing between continuous shooting according to the fourth embodiment of the present invention. Similarly to the third embodiment, since this processing is only executed for the second and subsequent shots of continuous shooting, the initial execution of this processing corresponds to the processing of the second shot of continuous shooting. The value of the continuous shooting counter N at that point is 2. In step S801, the sequence checks whether the present image sensing is for the second shot of the continuous shooting. If it is the second shot of continuous shooting (the value of the continuous shooting counter N is 2), the sequence proceeds to step S802. If not, the sequence proceeds to step S803.

In step S802, the position of the focus lens group 3 at the time of image sensing of the first shot of continuous shooting (in-focus position FP1) is set as the center ObjP2 of a scan range. Subsequently, the scan range is set in the same manner as in the third embodiment. When the setting of the scan range is concluded, the sequence proceeds to step S813.

In step S803, the sequence checks whether face detection immediately prior to the first shot has succeeded. If the face detection immediately prior to the first shot has not succeeded, the sequence proceeds to step S808. If detection has succeeded, the sequence proceeds to step S804, and face detection is performed using the image, displayed as an image on the LCD 10, which is immediately prior to the image sensing of the second shot. Then, in step S805, the sequence checks whether face detection has succeeded. If face detection has not succeeded, the sequence proceeds to step S808. If succeeded, the sequence proceeds to step S806.

If face detection has succeeded, the size and the on-screen position of the detected face are obtained. Then, the change in distance to the object is obtained from the face sizes. The specific method used therefor is similar to the third embodiment. In other words, if the respective results (face sizes) of face detection performed on the first and second shots may be represented by Size(1) and Size(2) and the distance to the object at the time of the first shot by L(1), a distance change ΔLK may be expressed as ΔLK=Size(1)/Size(2)×L(1)−L(1).

If the number of faces detected by face detection performed for the first and second shots are both one, the face detection information of the detected faces is used. On the contrary, if a plurality of faces exist, the faces with the closest on-screen position between the first- and third-shot images is used. If there are a plurality of faces at positions of similar closeness between the images, the face that is closest to the center of the screen will be used.

Next, the change in distance to the object from the first shot to the second shot is obtained from the in-focus positions at the time of the image sensings of the first and second shots of the continuous shooting. The specific method used therefor is similar to the third embodiment, where if the distances to the object in the first and second shots may be respectively represented as L(1) and LAF(2), a distance change ΔLAF may be expressed as

ΔLAF=LAF(2)−L(1).

In step S807, the distance changes ΔLK and ΔLAF respectively obtained in step S806 are compared to each other. As a result, if the difference between the two distance changes is small, the prediction of object movement is judged to be correct and the sequence proceeds to step S808. In step S808, the sequence checks whether the present shot is the third shot of the continuous shooting (whether the value of the continuous shooting counter N is 3). If so, the sequence proceeds to step S809. If not (if the present image sensing is for the fourth or subsequent shots), the sequence proceeds to step S810.

If the present shot is the third shot, information regarding two in-focus positions (FP1, FP2) corresponding to the first and second shots of the continuous shooting exist as in-focus position history information. Thus, in step S809, assuming that the time between sequential image sensings is constant, an object position is predicted (a in-focus position for an image sensing of the third shot is predicted) by first-order approximation from information regarding the two in-focus positions, and a central position ObjP3 of a scan range is calculated using Formula (1).

ObjP3=FP2+(FP2−FP1)×FpAdj3    (1).

The parameter FpAdj3 is for weighting an object position prediction result and the last in-focus position, and has a value ranging from 0 to 1. Thus, a scan range is set based on a central position ObjP3 calculated as described above, and the scan range is shifted in the direction in which the object image moves from the previous scan range. The specific method used therefor is the same as the third embodiment. When the setting of the scan range is concluded, the sequence proceeds to step S813.

In step S810, since the present shot is the fourth or subsequent shot, information regarding at least three in-focus positions exist as in-focus position history information. Therefore, assuming that the time intervals between sequential image sensings are constant, an object position is predicted (in-focus position at the time of the present image sensing is predicted) using second-order approximation. For instance, the central position ObjP4 of the scan range when performing image sensing on the fourth shot may be calculated by Formula (2). Thus, the scan range is set based on the central position ObjP4 calculated as described above, and the scan range is shifted in the direction in which the object image moves from the previous scan range.

$$ObjP4 = (FP1 - 3FP2 + 3FP3) \times FpAdj4 + FP3(1 - FpAdj4) \quad (2)$$
$$= (FP1 - 3FP2 + 2FP3) \times FpAdj4 + FP3.$$

The specific method used therefor is the same as the third embodiment. The sequence then proceeds to step S813.

On the other hand, if the two distance changes are not approximately equal in step S807, the sequence proceeds to step S811. A scan center and a scan range are reset.

In other words, the scan center is changed using the face detection results. Additionally, in order to remove adverse effects in that a moved main object will fall out of the scan range, setting is performed so as to include the moved main object in the scan range. More specifically, a scan range that is around 1 to 2 times the scan range set in step S809 is set in order to ensure that the object is brought into focus even after movement of the object. Upon conclusion of the processing of step S811, the continuous shooting counter N is initialized to 1 in step S812. As a result, when it is determined that the object has not moved because, inter alia, the background remains in focus, image sensing performed at this point is treated as an image sensing of the first shot, although the shot is not the first shot in the continuous shooting. Therefore, the next image sensing will be treated as an image sensing of the second shot. The same applies for subsequent image sensings.

After the above processing is concluded, the sequence proceeds to step S813. In step S813, scanning is performed according to the flowchart shown in FIG. 7 described earlier in the first embodiment to calculate a peak value from the focus evaluation values, and in step S814, the focus lens group 3 is moved to the peak position.

The specific procedure of the resetting of the scan center and the scan range performed in step S811 will now be described with reference to FIG. 14. Since the processing of steps S501 to S507 is the same as the processing described in the third embodiment with reference to FIG. 11, a description thereof will be omitted. If the scan range set prior to step S507 neither exceeds nor cover the entire range, a scan central position is obtained in step S908 from face detection results.

First, a distance to an object L(1) is obtained from the AF result (in-focus position) of the first shot by referencing a table indicating the relationship between focus lens positions and distances to in-focus objects which is created from the results of adjustments performed at the time of the production of the camera.

Next, from the face detection results of the first and second shots, the distance to the object L(3) of the scan center of the third shot is calculated as

L(3)=2L(2)−L(1), where L(2)=Size(1)/Size(2)*L(1), and Size(1), Size(2) are face sizes respectively obtained from the face detection results of the first and second shots.

Then, a focus lens position ObjP3 of the scan center is obtained from the distance L(3) of the scan center by referencing the table indicating the relationship between focus lens positions and distances to in-focus objects.

At this point, if the scan center has been changed based on face size information, the scan range is doubled in consideration of focus control error and detection error of the central position.

For the image sensing of the fourth and subsequent shots, an distance to the object L(n) of the scan center is obtained as a quadratic function using three immediately preceding face detection results (face sizes), Size(n−1)−8·Size(n−2)+3·Size(n−3), and an distance to the object L(n−3) obtained from the in-focus position at the time of the image sensing of three shots prior to the present shot. For this purpose, the following formula is used.

$$L(n)=Size(n-3)/Size(n) \times L(n-3),$$

where Size(n)=6·Size(n−1)−8·Size(n−2)+3·Size(n−3), and Size(n−1), Size(n−2) and Size(n−3) respectively represent face sizes obtained from the face detection results of one, two and three shots prior to the present shot.

A focus lens position ObjPn of the scan center is calculated from the distance to the object L(n) of the scan center by referencing the table indicating the relationship between focus lens positions and distances to in-focus objects.

Since the scan center has similarly been changed based on face size information, the scan range is doubled in consideration of focus control error and detection error of the central position.

As described above, according to the fourth embodiment, it is possible to remove adverse effects during image sensing in that the background or the like is brought into focus instead of a main object, and the main object may be brought into focus more reliably.

The fourth embodiment is also arranged to change the scan center and reset the scan range based on face size information in order to ensure that the object is brought into focus when the calculation results of ΔLK and ΔLAF are not approximately equal. By contrast, when the reliability of the focus lens position corresponding to the distance to the object obtained from face size information is sufficiently high, it is possible to change only the scan position without changing the width of the scan range. In this case, since the scan center has also moved, during operations for detecting an in-focus state, the movement of the focus lens is greater than the normal (or the previous) amount of movement.

Fifth Embodiment

A fifth embodiment of the present invention differs from the third embodiment in that scan ranges for performing AF processing between continuous shooting is switched according to whether face detection has succeeded or not.

Figure 15A:
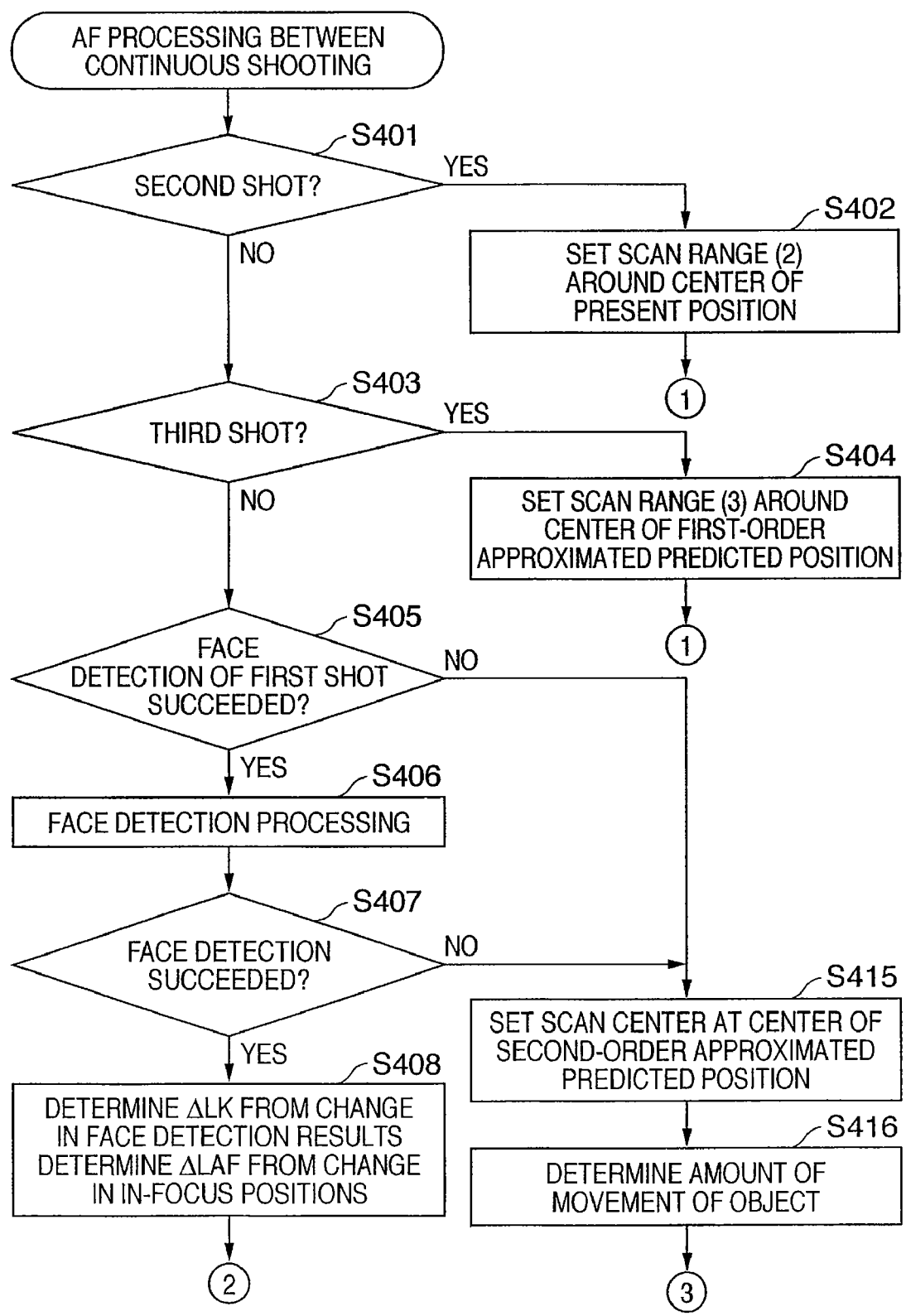
FIGS. 15A and 15B are flowcharts showing a procedure of AF processing between continuous shooting according to the fifth embodiment of the present invention.
Figure 15B:
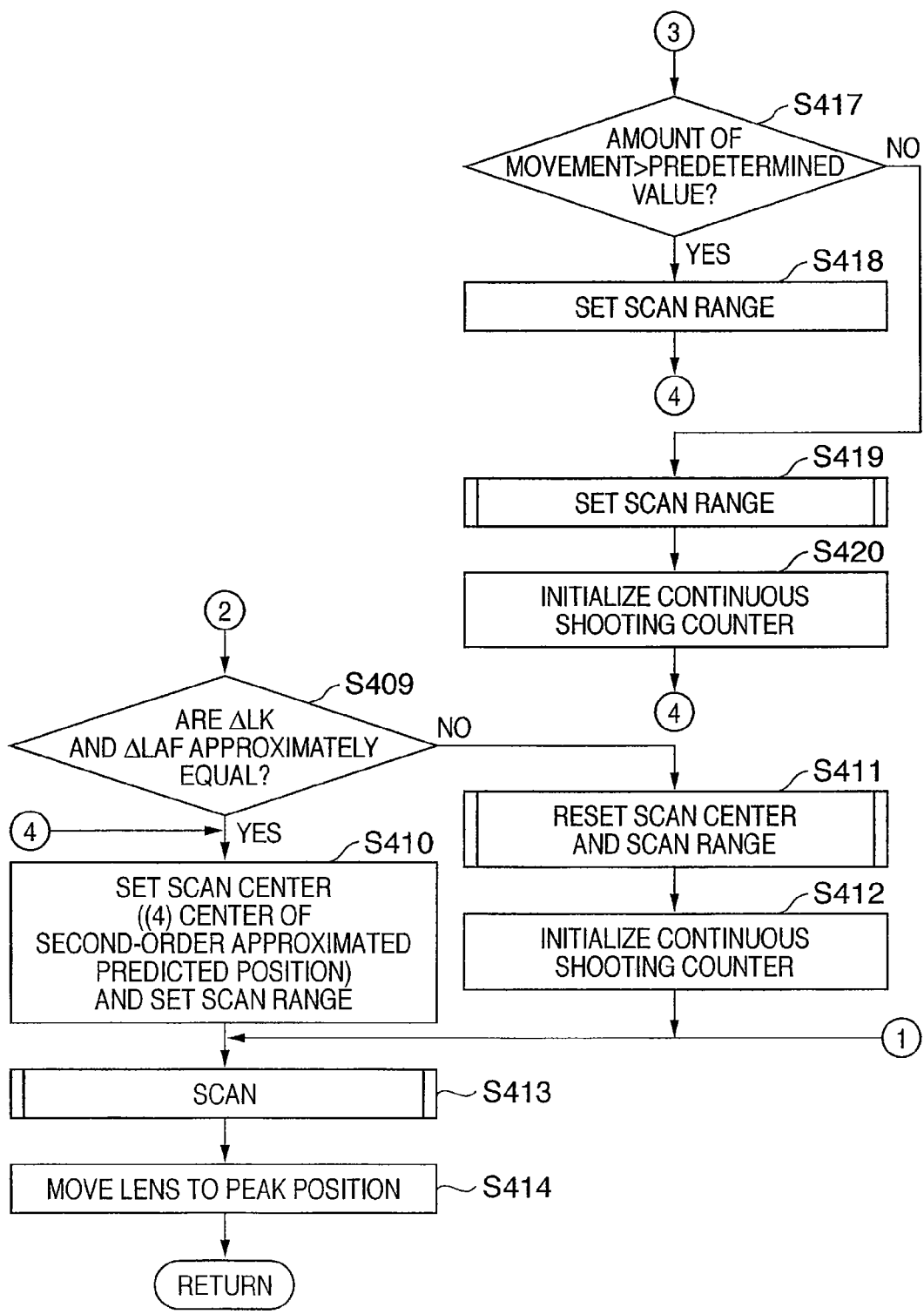
Figure 16A:
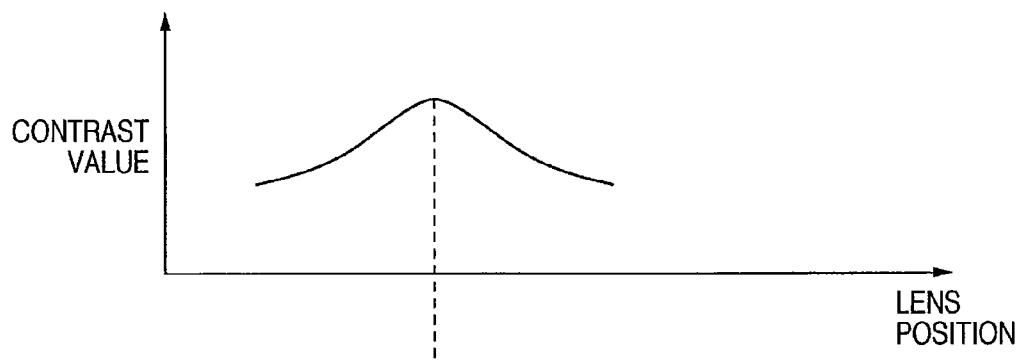
FIGS. 16A to 16C describe conventional AF processing.
Figure 16B:
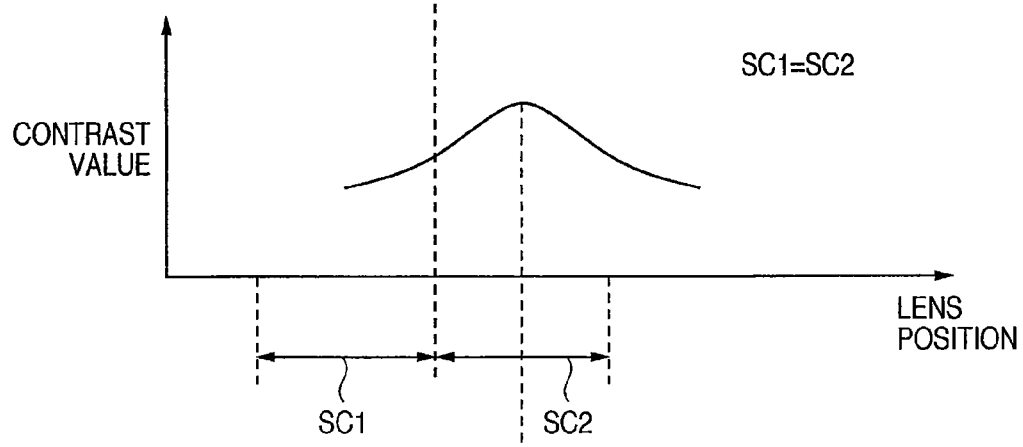
Figure 16C:
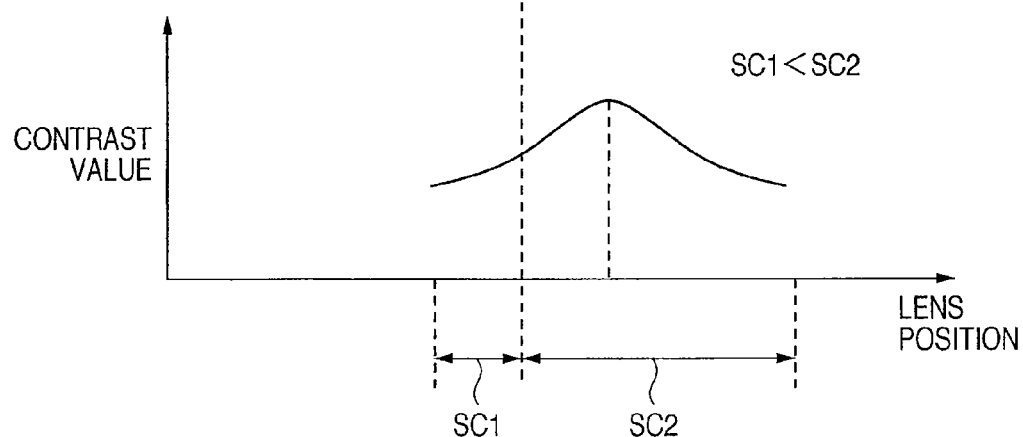

Details of AF processing between continuous shooting will now be provided with reference to FIGS. 15A and 15B. Processes that are similar to those depicted in the flow of AF processing between continuous shooting according to the third embodiment and shown in FIG. 10 are denoted using like step numerals, and descriptions thereof will be omitted.

When face detection has not succeeded in steps S405 and S407, the sequence proceeds to step S415. Since the present shot is the fourth or subsequent shot, information regarding at least three in-focus positions FP1, FP2 and FP3 respectively used for image sensing exists as in-focus position history information. Since the time interval between sequential image sensings is constant, an object position is predicted (an in-focus position at the time of the present image sensing is predicted) using second-order approximation. For instance, a central position ObjP4 of a scan range when performing image sensing on the fourth shot may be calculated by above-described Formula (2).

In this case, unlike up to the third shot, the scan range will not be set.

Next, in step S416, the absolute value of the difference between the in-focus position FP3 of the image sensing of the third shot and the calculated central position ObjP4 is obtained to be used as the amount of movement of the object in the direction of the optical axis. For the fifth and subsequent shots, the absolute value of the difference between a calculated central position and the in-focus position at its immediately preceding image sensing will be used as the amount of movement.

In step S417, a judgment is made on whether the object is significantly moving in the direction of the optical axis by comparing the amount of movement of the object in the direction of the optical axis, calculated in step S416, with a predetermined value. As a result, when the amount of movement of the object in the direction of the optical axis exceeds a predetermined value, the sequence proceeds to step S418 to set a scan range. The setting method used in this case is that same as those used in steps S402 and S404, and setting is performed by prioritizing that the image sensing interval between sequential image sensings will not be extended. The sequence then proceeds to step S413.

On the other hand, if the amount of movement of the object in the direction of the optical axis is equal to or less than the predetermined value, the sequence proceeds to step S419 to set a scan range. In this case, in order to remove adverse effects caused by a phenomenon such as described below in that a moved main object will fall out of the scan range, setting is performed so as to include the moved main object in the scan range.

For instance, when the background makes up a significant portion of the AF area at the time of the image sensing of the first shot, there are cases where the background is brought into and will remain in focus. An example thereof is a case where the high proportion of the background to the AF area brings the background into focus during image sensing of the first shot, and the background subsequently remains in focus instead of the main object because the proportion of the background to the AF area remains high. Then, when the main object moves and the proportion of the background to the AF area increases, the moved main object will fall out of the scan range set in step S404 and the like, thereby preventing the object to come into focus.

In consideration thereof, the predetermined value used for comparison in step S417 will be used to judge whether the results of AF processing between continuous shots cause to keep focusing on the background. The value will enable determination that the object has not moved in consideration of detection errors of in-focus positions and predicted positions and the like.

A scan range is set in step S419. In this case, since it is judged that the object is not moving significantly, focus accuracy is emphasized over continuous shooting speed. Therefore, in order to accurately bring the object into focus, a scan range that is around 1 to 3 times the scan range set in step S418, for instance, is set.

More specifically, a scan range is set in the manner described earlier with respect to the first embodiment with reference to FIG. 5.

Upon conclusion of scan range setting processing as described above, the sequence returns to FIG. 15B to initialize the continuous shooting counter N to 1 in step S420. As a result, when it is judged that the object has not moved because, inter alia, the background remains in focus, image sensing performed at this point is treated as an image sensing of the first shot, although the present shot is not the first shot in the continuous shooting. Therefore, the next image sensing will be treated as an image sensing of the second shot. The same applies for subsequent image sensings.

After the above processing is concluded, the sequence proceeds to step S413. In step S413, scanning is performed according to the flowchart shown in FIG. 7 described earlier to calculate a peak value from the focus evaluation values, and in step S414, the focus lens group 3 is moved to a peak position (in-focus position) that is a position of the focus lens corresponding to the calculated peak value.

In the same manner, for a fifth and subsequent shots of the continuous shooting (the value of the continuous shooting counter N is equal to or greater than 5), in step S415 of FIG. 15A, an object position is predicted (an in-focus position at the time of the present image sensing is predicted) using second-order approximation, and a central position ObjP(n) of a scan range is calculated using above-described Formula (3). Thus, the scan range is set based on the central position ObjP(n) calculated as described above, and the scan range is shifted in the direction in which the object image moves from the previous scan range.

However, in the same manner as in the image sensing of the fourth shot, when the amount of movement of the object is equal to or less than a predetermined value, the sequence proceeds from step S419 to step S420 and sets a scan range so that the object is reliably brought into focus.

Although performing such processing will result in a decrease in the number of shots performed per a unit time in the continuous shooting, the main object will be reliably brought into focus. Since the speed of continuous shooting (the number of shots performed per a unit time) is relatively not a problem when the object is actually not moving or, even when moving, not moving significantly, a wide scan range may be set. This is due to the fact that, with an object with little movement, the position of a main object within the screen during scanning remains almost unmoved, and in many cases object movement is minimal even when the image sensing interval of continuous shooting is relatively wide.

According to the above processing, it is possible to remove adverse effects caused by above-described reasons wherein the background is brought into focus instead of a moved main object.

As described above, the third and fourth embodiments are arranged to perform in-focus position detection operations and consecutively perform image sensings of a plurality of images after acquiring an in-focus position. During such operations, an in-focus position up to the point of the relevant image sensing is roughly predicted from one or more in-focus positions previously obtained at the time of respective image sensing, and a retrieval of an accurate in-focus position (scanning of an in-focus position) is performed based on the roughly predicted in-focus position. This increases focusing capabilities with respect to an ordinary object such as those approaching at a constant speed.

In addition, when the main object is a person, determination is made on whether a distance change calculated from the above-described roughly predicted in-focus positions at the time of predicted image sensings is substantially equal to a distance change predicted from changes in face sizes determined by a face detecting unit. When the two distance changes are not equal, retrieval of an in-focus position (scanning of an in-focus position) is performed within either a range that is wider than a range in the case the two distance changes are equal, or within the entire range (infinity to relevant closest distance). When the background is erroneously brought into focus, the in-focus position virtually remains unchanged and the two distance changes do not match. Therefore, in such cases, it is possible to bring a moving main object into focus by performing in-focus position retrieval within a relatively wide range or the entire range (infinity to relevant closest distance).

In this case, the time necessary for accurate in-focus position retrieval that is performed between image sensings will increase. As a result, while the number of shots performed during a unit time will decrease when consecutively performing image sensing of a plurality of images after obtaining the initial in-focus position, as far as focus is concerned, the correct focus position will be obtained and image quality will increase.

The third to fifth embodiments have been arranged so that, for instance, the scan range is changed (widened) according to prediction results such that the background is kept in focus. However, the present invention is not limited to this example. For instance, when it is predicted that the background is kept in focus, the apparatus may be controlled so as to move the central position of the scan range by referencing in-focus position history information or face information (face size, position and the like).

In addition, while the third to fifth embodiments have been arranged so that change in distance to the object is calculated primarily using face size information among face information, the present invention may be arranged to calculate change in distance to the object based on face positions within the image plane. Furthermore, the above-described embodiments are arranged to judge whether a calculated in-focus position is the in-focus position of the main object based on face information. However, the basis of such judgment need not be limited to face information. For instance, characteristic information such as the size or position of an entire object may be used instead.

Moreover, while the third to fifth embodiments have been described using an example of a compact-type digital camera, the present invention is also applicable to the phase difference AF of digital video cameras and digital SLRs. A specific description will now be given. The predicted object position for image sensing of the second shot of continuous shooting takes a predicted object position corresponding to the position of the focus lens group 3 at the time of image sensing of the first shot. In addition, the predicted object position for image sensing of the third shot of the continuous shooting may be obtained by performing object position prediction using first-order approximation from information regarding the two in-focus positions corresponding to the first and second shots. Furthermore, the predicted object position for image sensing of the fourth and subsequent shots of the continuous shooting may be obtained by performing object position prediction using second-order approximation from information regarding in-focus positions used for at least three image sensings as in-focus position history information. From these results, if the amount of movement of the object in the direction of the optical axis is equal to or lower than a predetermined value, the apparatus is controlled to detect whether the results of AF processing between continuous shooting causes to keep the background in focus. This enables determination to be made on whether the main object is appropriately brought into focus. Additionally, in the same manner as in the third and fourth embodiments, object movement is predicted from the results of face detection processing (face size) performed at each image sensing, and judgment is made on whether the distance change is approximately equal to the change in distance to the object calculated from in-focus positions. From the judgment results, the apparatus is controlled to detect whether the results of AF processing between continuous shooting causes to keep the background in focus. This enables determination to be made on whether the main object is appropriately brought into focus. Using the prediction results, for instance, the focus lens is first moved to an in-focus position predicted during phase difference AF, and phase difference AF is then executed based on signals from an AF sensor. As a result, since it is possible to perform minute adjustment in a state where the focus lens is in the proximity of the in-focus position, accuracy may be improved.

In addition, as described above, it is possible to estimate from in-focus position history or face detection results whether the main object is appropriately brought into focus or whether somewhere other than the intended object is brought into focus. As a result, by using information regarding whether somewhere other than the intended object is brought into focus, it is possible to re-perform phase difference AF or perform adjustment so that a more desirable object is brought into focus.

Furthermore, the fifth embodiment has been arranged so that, when face detection is successful, AF processing between continuous shooting is performed in the same manner as in the third embodiment. However, when face detection is successful in the fifth embodiment, AF processing between continuous shooting may be arranged to be performed instead in the same manner as in the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-210253, filed on Aug. 1, 2006, and Japanese Patent Application No. 2007-124693, filed on May 9, 2007, which are hereby incorporated by reference herein in their entirety.

What is claimed is:

1. A focus control apparatus comprising:
a moving range determination unit that determines a range in which a focus lens is to be moved; and
a controller that makes the focus lens move within a range determined by said moving range determination unit, determines an in-focus state based on an output signal from an image sensing unit obtained in association with the movement of the focus lens within the range, and controls a focus lens driver so that an object image is brought into focus,
wherein, when a difference between positions of the focus lens, at which a plurality of images are brought into focus, is equal to or lower than a preset threshold, said moving range determination unit determines as the range a range that is wider than a range that is determined in a case where the difference exceeds the threshold.

2. The focus control apparatus according to claim 1, wherein, when the difference is equal to or lower than the threshold, said moving range determination unit determines as the range the entire drivable range of the focus lens in which the determination of in-focus state is available.

3. The focus control apparatus according to claim 2, wherein the threshold is 0.

4. The focus control apparatus according to claim 1, wherein, with the exception of cases where the difference is equal to or lower than the threshold, said moving range determination unit determines the range so that said controller finishes obtaining an in-focus state within a predetermined amount of time.

5. The focus control apparatus according to claim 4, wherein, when the difference exceeds the threshold, said moving range determination unit determines the range further based on the amount of movement of image plane of an object.

6. The focus control apparatus according to claim 1, wherein said moving range determination unit determines the range while setting the drivable range of the focus lens as an upper limit of the range.

7. The focus control apparatus according to claim 1, wherein the threshold is a value based on detection errors of at least an in-focus position and a predicted position.

8. The focus control apparatus according to claim 1, wherein, during continuous shooting, said moving range determination unit determines the range based on a comparison result of a difference between positions of the focus lens where an in-focus state is achieved for the plurality of images obtained by image sensing, and the threshold.

9. An image sensing apparatus comprising said focus control apparatus according to claim 1 and said image sensing unit.

10. A focus control method comprising:
a moving range determination step of determining a range in which a focus lens is to be moved; and
a control step of moving the focus lens in a range determined in said moving range determination step, determining an in-focus state based on an output signal from an image sensing unit obtained in association with the movement of the focus lens within the range, and moving the focus lens so that an object image is brought into focus,
wherein, when a difference between positions of the focus lens, at which a plurality of images are brought into focus, is equal to or lower than a preset threshold, said moving range determination step determines as the range a range that is wider than a range that is determined in a case where the difference exceeds the threshold.

11. A focus control apparatus comprising:
an image sensing unit that photoelectrically converts an object image formed by a focus lens and acquires an image; and
a controller that detects an in-focus state of the focus lens based on an image acquired from said image sensing unit in association with the movement of the focus lens, and controls the position of the focus lens based on the detected in-focus state,
wherein said controller changes the range in which the focus lens is to be moved upon detection of the in-focus state based on a change in object size in images acquired by said image sensing unit.

12. The focus control apparatus according to claim 11, wherein, when the change in object size in the images is greater than a change based on in-focus positions at the time of a plurality of image sensings, the amount of movement of the focus lens when detecting an in-focus state of the focus lens is made larger than a predetermined amount.

13. An image sensing apparatus comprising the focus control apparatus according to claim 11 and the focus lens.

14. A focus control apparatus comprising:
an image sensing unit that photoelectrically converts an object image formed by a focus lens and acquires an image;

a detection unit that detects characteristic information of an object from an image obtained by said image sensing unit;

a range determination unit that determines a range in which the focus lens is to be moved; and a controller that detects an in-focus state of the focus lens based on an image acquired from said image sensing unit in association with the movement of the focus lens within a range determined by said range determination unit, and controls the position of the focus lens based on the detected in-focus state so that the object image is brought into focus, wherein said range determination unit detects an in-focus predicted position from the positions of the focus lens at which the object is brought into focus in the plurality of images obtained by image sensing, and changes the range in which the focus lens is to be moved based on the in-focus predicted position and the detection results of said detection unit, and wherein the characteristic information of the object is the size of the object.

15. The focus control apparatus according to claim 14, wherein, when the size of the object changes, said range determination unit widens the range in which the focus lens is to be moved compared to a case where the size of the object remains unchanged.

16. The focus control apparatus according to claim 14, wherein, when a change in the object size per image sensing is greater than the change in the in-focus predicted positions, said range determination unit widens the range in which the focus lens is to be moved in comparison to a case where the change in the object size per image sensing is smaller than the change in the in-focus predicted positions.

17. The focus control apparatus according to claim 14, wherein said range determination unit determines a position to which the focus lens is to be moved based on the object size information.

18. The focus control apparatus according to claim 14, wherein said range determination unit provides a wider range of the movement of the focus lens in a case where characteristic information of an object is not detected by said detection unit in comparison to a case where characteristic information of an object is detected.

19. An image sensing apparatus comprising the focus control apparatus according to claim 14 and the focus lens.

20. A focus control method comprising:

a control step of detecting an in-focus state of the focus lens based on an image acquired from the image sensing unit in association with the movement of the focus lens, and controlling the position of the focus lens based on the detected in-focus state, wherein the range in which the focus lens is to be moved upon detection of the in-focus state is changed based on a change in object size in images acquired by said image sensing unit.

21. A focus control method comprising:

a detecting step of detecting characteristic information of an object from an image obtained by photoelectrically converting an object image formed by a focus lens;

a range determination step of determining a range in which the focus lens is to be moved; and a control step of detecting an in-focus state of the focus lens based on an image acquired in association with the movement of the focus lens within a range determined in said range determination step, and controlling the position of the focus lens based on the detected in-focus state so that the object image is brought into focus, wherein, in said range determination step, an in-focus predicted position is detected from the position of the focus lens at which the object is brought into focus in the plurality of images obtained by image sensing, and the range in which the focus lens is to be moved is changed based on the in-focus predicted position and the detection results in said detection step, and wherein the characteristic information of the object is the size of the object.

* * * * *